United States Patent
Frisken et al.

(10) Patent No.: US 9,288,559 B2
(45) Date of Patent: Mar. 15, 2016

(54) MULTI DIRECTIONAL MULTIPLEXER

(75) Inventors: Steven James Frisken, Vaucluse (AU); Jonathan Plumridge, Sydney (AU)

(73) Assignee: Finisar Corporation, Sunnyvale, CA (US)

(*) Notice: Subject to any disclaimer, the term of this patent is extended or adjusted under 35 U.S.C. 154(b) by 0 days.

(21) Appl. No.: 14/236,316

(22) PCT Filed: Jul. 19, 2012

(86) PCT No.: PCT/AU2012/000861
§ 371 (c)(1),
(2), (4) Date: Jan. 30, 2014

(87) PCT Pub. No.: WO2013/016758
PCT Pub. Date: Feb. 7, 2013

(65) Prior Publication Data
US 2014/0186038 A1 Jul. 3, 2014

Related U.S. Application Data

(60) Provisional application No. 61/513,902, filed on Aug. 1, 2011.

(51) Int. Cl.
*H04J 14/00* (2006.01)
*H04Q 11/00* (2006.01)
(Continued)

(52) U.S. Cl.
CPC ............ *H04Q 11/0005* (2013.01); *G02B 6/356* (2013.01); *G02F 1/31* (2013.01); *H04J 14/02* (2013.01); *G02B 6/3512* (2013.01); *G02B 6/3546* (2013.01); *G02B 6/3592* (2013.01); *G02F 1/136277* (2013.01)

(58) Field of Classification Search
CPC .............................. H04Q 11/0005; H04J 14/02
See application file for complete search history.

(56) References Cited

U.S. PATENT DOCUMENTS 4,937,539 A   6/1990   Grinberg et al.
6,707,959 B2  3/2004   Ducellier et al.
(Continued)

OTHER PUBLICATIONS

"Search Report" for PCT Application No. PCT/AU2012/000861, Aug. 22, 2012, 5 pages, Australian Patent Office, Woden, Australia.
(Continued)

*Primary Examiner* — Danny Leung
(74) *Attorney, Agent, or Firm* — Kurt Rauschenbach; Rauschenbach Patent Law Group, LLC

(57) ABSTRACT

Described herein is an optical transmission cross-connect for routing wavelength signals to a bank of directionless transceivers. One embodiment (1) includes an array of four common-port fibers (3) for transmitting and receiving a multiplexed optical signal and an array of sixteen add/drop fibers (5) for receiving and transmitting demultiplexed signals including individual wavelength channels. A dispersive grism (7) simultaneously spatially separates the wavelength channels from the optical signals in a dispersion dimension. A lens (45) focuses each said spatially separated wavelength channel in the dispersion dimension. A Liquid Crystal on Silicon (LCOS) device (11) separately manipulates each of the focused spatially separated wavelength channels to selectively steer the wavelength channels in a switching dimension. A micro-electromechanical mirror (MEMS) array (13) independently selectively directs the wavelength channels in the switching dimension such that the wavelength channels are coupled to predetermined ones of the add/drop fibers (5).

21 Claims, 20 Drawing Sheets

(51) Int. Cl.
  *G02F 1/31* (2006.01)
  *H04J 14/02* (2006.01)
  *G02B 6/35* (2006.01)
  *G02F 1/1362* (2006.01)

(56) References Cited

U.S. PATENT DOCUMENTS

| 7,397,980 | B2 | 7/2008 | Frisken | |
|---|---|---|---|---|
| 2005/0276537 | A1* | 12/2005 | Frisken | 385/24 |
| 2008/0219663 | A1 | 9/2008 | Yuan et al. | |
| 2008/0316585 | A1 | 12/2008 | Cohen et al. | |
| 2009/0220233 | A1* | 9/2009 | Presley et al. | 398/79 |
| 2010/0172646 | A1 | 7/2010 | Colbourne | |

OTHER PUBLICATIONS

A Performance Comparison of WSS Switch Engine Technologies, May 2009, 24 pages, www.jdsu.com, JDS Uniphase.

* cited by examiner

MULTI DIRECTIONAL MULTIPLEXER

CROSS-REFERENCE TO RELATED APPLICATION

This application is a 35 U.S.C. §371 application based on PCT/AU2012/000861 filed Jul. 19, 2012, entitled "Multi Directional Multiplexer" which claims priority to U.S. Provisional Patent Application Ser. No. 61/513,902, entitled "Multi Directional Multiplexer". The entire disclosures of these applications are incorporated herein by reference.

FIELD OF THE INVENTION

The present invention relates to optical switches and in particular to a device for dynamically switching individual wavelength channels from a plurality of input ports to a plurality of output ports. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

In recent years there has been a rapid increase in user demand for higher data rate information and communication services. A major driver for this demand is the increase in popularity of high data rate media streaming services such as video-on-demand and voice over IP (VoIP), which require fast broadband internet services. Capability for these high bandwidth services is increasingly being provided by optical networks incorporating dense wavelength division multiplexing (DWDM) schemes. Such schemes involve combining multiple wavelength channels into a single optical signal and transmitting the signal over high bandwidth optical fibers.

A limiting factor in most optical networks is the ability to rapidly and dynamically route each optical channel from its constituent multiplexed signal within an optical fiber to other fibers and eventually to a desired end user. Traditionally such routing or switching was performed in the electrical domain. However, electrical switching is relatively slow due to the necessary conversion from the optical domain to the electrical domain and back again. With increased bandwidth demands, switching has been shifted to the optical domain where much higher speeds can be realized.

Current optical switching is typically performed by wavelength selective switches (WSSs), which currently allow reconfigurable switching of wavelength channels from a single input fiber to one of a number of output fibers to drop or reroute particular wavelength channels. WSSs generally include a demultiplexing module complemented with a corresponding multiplexing module, which collectively perform adding and dropping of individual optical channels from DWDM signals. The reconfigurable nature of these switches makes them favorable for dynamically routing particular wavelength channels across a network depending on user demand, network disruptions and other factors.

As demand for higher network capacity increases, a need for the ability to simultaneously and reconfigurably switch wavelength channels between multiple input ports and multiple outputs is becoming apparent. When compared to existing single input-multiple output devices, this design is advantageous in reducing the number of required switching devices in the network and improving network reliability as signals can be easily routed away from individual problematic fibers.

More recent implementations seek to route wavelength channels in a "colorless", "directionless" and "contentionless" manner. A colorless WSS is a device that can route a channel independent of its wavelength. That is, the device has no hardware constraints on wavelength routing. Directionless WSS devices are capable of routing a particular wavelength channel from any input port to any output port in any direction. A contentionless WSS design permits routing of multiple wavelength channels having the same wavelength without suffering significant crosstalk.

A further desirable feature of a WSS is spectral flexibility. The hardware designs of most WSS devices restrict channel routing to wavelength grids having a fixed channel plan. That is, channels having a fixed spectral spacing and spectral width. WSS designs having spectral flexibility permit routing that is not limited to a particular channel plan. Therefore, these designs are capable of readily adapting to changes in channel plans that can occur over time.

U.S. Pat. No. 7,397,980 to Frisken, entitled. "Dual-Source Optical Wavelength Processor" discloses an optical switch capable of reconfigurably switching channels from two separate input sources to a number of output ports. This is achieved by first transmitting the two vertically displaced signals coincidentally onto a grism to spatially separate the multiplexed wavelength channels in a horizontal dispersion dimension. The dispersed wavelength channels of each signal are then incident onto separate wavelength processing regions of a liquid crystal on silicon (LCOS) device. The wavelength processing regions are defined by two vertically separated subsets of the LCOS pixels. Each incident wavelength signal is focused in the dispersion dimension but collimated in the vertical plane such that the signals are incident onto a vertically disposed array of LCOS pixels. By applying predetermined independent phase manipulation functions to specific vertical rows of LCOS pixels (corresponding to the position of each wavelength channel), the phase front of each channel can be directionally controlled in the vertical plane. This allows independent steering of each wavelength channel to select a desired output port for each respective channel.

In Frisken, two separate inputs are essentially independent from each other and wavelength channels from each input are treated separately. That is, outputs are hardwired to a given input. Aside from desiring flexibility in switching between inputs and outputs, extending the number of inputs to higher numbers in itself is not straightforward. In particular, as the number of available pixels on an LCOS device is limited, adding more wavelength processing regions comes at the cost of sacrificing the number of pixels available for each processing region. The smaller available number of pixels provides difficulties in steering to peripheral ports, particularly when a larger number of output ports are included. This peripheral steering is required to dynamically allocate each output port to a given input port without sacrificing the advantage of flexible channel allocation through a fixed array.

US Patent Application Publication 2010/0172646 A1 to Colbourne, entitled "M×N Wavelength Selective Optical Switch" discloses an optical device for switching a number (K) of individual wavelength channels from one of an arbitrary number (M) of input fibers to one of an arbitrary number (N) of output fibers. A diffraction grating is used to spatially separate the individual wavelength channels of each optical signal. The wavelength channels are incident onto individual mirrors of a first MEMS array having M×K individual mirrors before being coupled back through the diffraction grating where the channels are spatially recombined but angularly separated. The recombined channels are transmitted through a switching lens which individually directs each wavelength signal, depending on angle set by the first MEMS array, to a particular mirror of a second MEMS array having N mirrors. Each MEMS mirror of the second MEMS array is associated with a particular output fiber and the particular wavelength channel coupled to that fiber is determined by the angle of each MEMS mirror.

The implementation disclosed in Colbourne is not a spectrally flexible architecture. Specifically, due to the fixed positions of the MEMS mirrors, this arrangement is not capable of handling flexible spectral grids. That is, the MEMS mirrors are each disposed in a predetermined fixed location to route a particular wavelength channel based on a fixed channel spacing. If the channel spacing or channel bandwidth is varied, the routing of the wavelength channels becomes much less efficient.

In Colbourne, individual wavelength channels can be routed from any input fiber to any output fiber in a colorless and directionless manner by controlling the tilt angles of two MEMS arrays. However, as seen in FIG. 2A of that document, each separated wavelength channel is reimaged at an intermediate focal plane before being coupled to an output fiber. At the intermediate focal plane, each channel of a common input fiber shares a common spatial spot but has a different trajectory angle. Switching to a desired output fiber is performed by a switching lens of small focal length to convert the angle θ to a displacement. Therefore, the maximum separation of the wavelength channels is approximately limited to the focal length of this switching lens multiplied by the angle. Consequently, using such a configuration in cases where the switching matrix is an LCOS device, switching to distant output ports is limited, thereby practically limiting this device to small numbers of output fibers.

Therefore, there is a desire to provide a wavelength selective switch that can efficiently and reconfigurably route wavelength channels from a plurality of input ports to a plurality of output ports in a spectrally flexible manner.

SUMMARY OF THE INVENTION

It is an object of the invention, in its preferred form to provide an improved optical switch for switching wavelength channels between a plurality of input ports and a plurality of output ports.

In accordance with a first aspect, the present disclosure provides an optical signal manipulation system including:
  a plurality of input ports configured for transmitting an optical signal including a plurality of wavelength channels, said input ports being spatially separated at least in a switching dimension;
  a wavelength dispersion element for simultaneously spatially separating said wavelength channels from said optical signals in a dispersion dimension perpendicular to said switching dimension;
  an optical power element for focusing each said spatially separated wavelength channel in said dispersion dimension;
  a wavelength manipulation element for separately manipulating each of the focused spatially separated wavelength channels to selectively steer the wavelength channels in at least the switching dimension; and
  a steering element for independently selectively directing the wavelength channels in at least the switching dimension such that said wavelength channels are coupled to predetermined output ports disposed in predetermined positions spaced at least along said switching dimension;
  wherein said wavelength manipulation element steers said wavelength channels by an angle in the switching dimension, relative to their respective originating input port, that is less than or substantially equal to the predetermined position of said output fiber divided by the focal length of said optical power element.

Preferably the angle is approximately half the predetermined position of the output fiber divided by the focal length of the optical power element.

In one embodiment, the output ports are preferably also spatially separated in the dispersion dimension and the wavelength manipulation element is also configured to also independently selectively direct the optical signals in the dispersion dimension. In further embodiments, the input ports are preferably also spatially separated in the dispersion dimension.

The wavelength manipulation element preferably steers each wavelength channel by an angle in the switching dimension, relative to a respective originating input port, that is less than an angle directed by the steering element in the switching dimension, relative to a respective output port.

The wavelength channels are preferably incident onto the wavelength manipulation element at substantially parallel angles in the switching dimension.

The steering element preferably includes a micro-electromechanical (MEMS) mirror array having one mirror for each output port.

The wavelength manipulation element preferably includes a liquid crystal on silicon (LCOS) device having a two-dimensional array of phase manipulation elements.

The LCOS device preferably includes a plurality of processing regions defined by a subset of the phase manipulation elements, each processing region being configured to independently manipulate the spatially separated wavelength channels originating from a corresponding input port. Each processing region preferably includes a plurality of spatially separated channel directing regions configured to independently selectively steer the wavelength channels in the switching dimension. The channel directing regions are preferably reconfigurable in size to accommodate wavelength channels of different spectral width and spacing. The channel directing regions on adjacent processing regions corresponding to a particular wavelength channel are preferably offset from one another in the dispersion dimension.

The optical signal manipulation system preferably further includes a Fourier transformer for converting the spatial offset of each optical signal to a predefined angle in the switching dimension. The Fourier transformer preferably includes:
  a first angled reflector surface for projecting said optical signals in a dimension perpendicular to their propagation direction;
  a spherical mirror for angularly encoding said optical signals with a predefined angle based on their respective position along the switching dimension; and
  a second angled reflector surface for returning said signals to their original propagation direction.

The optical signal manipulation system preferably includes a directional signal separator for separating, in space, optical signals propagating from the input ports to the wavelength manipulation element from optical signals propagating from the wavelength manipulation element to the steering element. The directional signal separator preferably includes an angled mirror having an aperture extending therethrough.

In one embodiment, the optical signal manipulation system preferably includes 4 input ports and 16 output ports. In an alternative embodiment, the optical signal manipulation system preferably includes 8 input ports and 20 output ports.

The optical signal manipulation system is preferably symmetric in optical path length about the wavelength manipulation element. Further, the optical signal manipulation system is preferably reversible in operation such that optical signals including one wavelength channel are input from the output ports to be coupled to predetermined input ports.

In accordance with a second aspect, the present disclosure provides an optical signal manipulation system including:
- a plurality of input ports configured for transmitting an optical signal including a plurality of wavelength channels, said input ports being spatially separated at least in a switching dimension;
- a wavelength dispersion element for simultaneously spatially separating said wavelength channels from said optical signals in a dispersion dimension perpendicular to said switching dimension;
- an optical power element for focusing each said spatially separated wavelength channel in said dispersion dimension;
- a wavelength manipulation element for separately manipulating each of the focused spatially separated wavelength channels to selectively steer the wavelength channels in at least the switching dimension; and
- a steering element for independently selectively directing the wavelength channels in at least the switching dimension such that said wavelength channels are coupled to predetermined output ports disposed in predetermined positions spaced at least along said switching dimension;
- wherein said wavelength manipulation element steers each said wavelength channel by an angle in the switching dimension, relative to a respective originating input port, which is less than an angle directed by said steering element in the switching dimension, relative to a respective output port.

In accordance with a third aspect, the present disclosure provides an optical signal manipulation system including:
- a plurality of input ports configured for transmitting an optical signal including a plurality of wavelength channels, said input ports being spatially separated at least in a switching dimension;
- a wavelength dispersion element for simultaneously spatially separating said wavelength channels from said optical signals in a dispersion dimension perpendicular to said switching dimension;
- an optical power element for focusing each said spatially separated wavelength channel in said dispersion dimension;
- a wavelength manipulation element for separately manipulating each of the focused spatially separated wavelength channels to selectively steer the wavelength channels in at least the switching dimension; and
- a steering element for independently selectively directing the wavelength channels in at least the switching dimension such that said wavelength channels are coupled to predetermined output ports disposed in predetermined positions spaced at least along said switching dimension;
- wherein wavelength channels transmitted from different input ports and having a common wavelength are incident onto said wavelength manipulation element at positions offset from each other in said dispersion dimension.

In accordance with a further aspect of the present invention, there is provided an optical signal manipulation system including: a series of optical input ports for each projecting a corresponding optical input signal, said signals including a predetermined series of wavelength channels; a translation unit for translating the relative spatial position of the optical input port to a corresponding relative angular projection of the ports optical input signal; an optical power element for focusing the optical energy of said optical input signals; and an optical dispersion system for spatially dividing out wavelength channels of each optical input signal; whereby the system produces an intermediate output of a series of spatially spaced columns for each optical input signal, with each column having its wavelength dispersed along the column.

In some embodiments, the columns of the intermediate output are offset in wavelength relative to one another. The intermediate output can be projected onto a variable response element for providing a variable directional response to the intermediate output. The variable directional response can then be recombined at a series of output ports. In some embodiments, the system operates in a directionless manner. In some embodiments, the variable response element comprises a variable diffraction grating. In some embodiments, the optical input ports are offset along an axis. In some embodiments, the system includes a polarisation alignment unit for aligning the polarisation of the optical input signals.

BRIEF DESCRIPTION OF THE DRAWINGS

Preferred embodiments of the disclosure will now be described, by way of example only, with reference to the accompanying drawings in which.

DETAILED DESCRIPTION OF PREFERRED EMBODIMENTS

Described herein is an optical signal manipulation system in the form of an optical transmission cross-connect device for routing wavelength signals to a bank of directionless transceivers. The device will primarily be described in terms of its demultiplexing operation, which has applications in routing particular channels from an optical transmission network to transceivers. However, it will be appreciated that the device is bidirectional and directionless in functionality and can similarly operate in a multiplexing configuration, either simultaneously or separately from the demultiplexing operation. For ease of reference the cross-connect device will be hereinafter referred to as a multidirectional multiplexer.

Throughout the description and drawings, the x-axis defines a switching dimension, the y-axis defines a wavelength dispersion dimension and the z-axis defines the optical axis and general direction of signal propagation.

Figure 1:
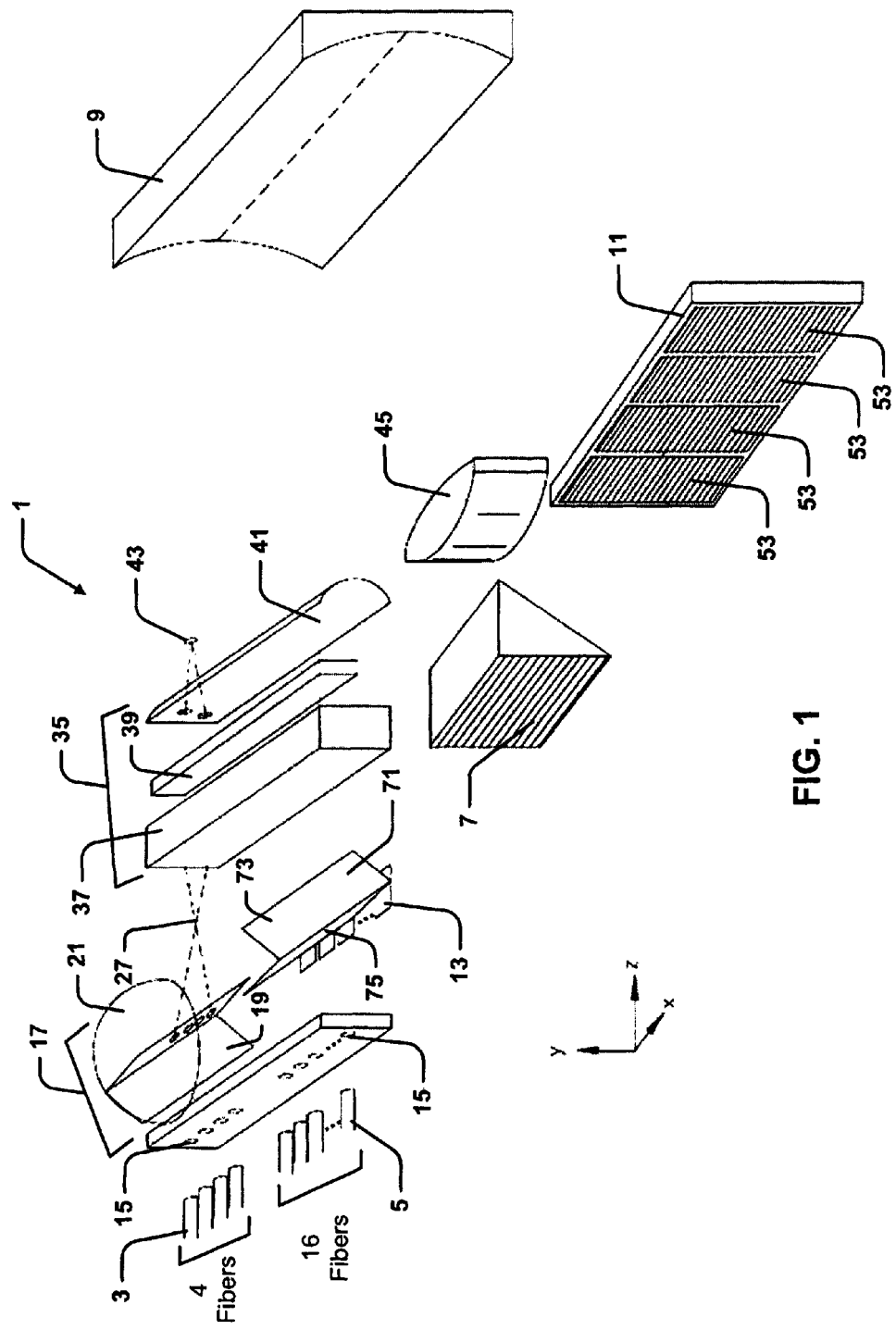
FIG. 1 is perspective view of a first embodiment multidirectional multiplexer.

Referring initially to FIG. 1, there is illustrated a first embodiment multidirectional multiplexer 1, including an array of four common-port fibers 3 for transmitting (and receiving in the multiplexing mode of operation) a multiplexed optical signal and an array of sixteen add/drop fibers 5 for receiving (and transmitting in the multiplexing mode of operation) demultiplexed signals including individual wavelength channels. Both arrays 3 and 5 are disposed at predetermined positions in the horizontal switching dimension but the fibers may also be displaced in other dimensions, as described below. Each input multiplexed signal includes a number of individual channels having a unique range of wavelengths, such as in a dense wavelength division multiplexed (DWDM) signal.

The signals incident from the common-port fibers 3 are transmitted through a Fourier transformer 17 and polarization diversity system 35 (both described below) and are reflected off a wavelength dispersion element in the form of a reflective grism 7. The grism 7 simultaneously spatially separates, in a vertical dispersion dimension, the wavelength channels contained within each optical signal. An optical power element, in the form of a cylindrical mirror 9, focuses each spatially separated wavelength channel, in the dispersion dimension, onto a wavelength manipulation element in the form of a liquid crystal on silicon (LCOS) device 11. The optical signals are incident onto the LCOS device 11 at angles substantially parallel with respect to each other in the switching dimension. However, in other embodiments, the signals are incident onto the LCOS device 11 at different angles in the switching dimension.

The LCOS device 11 separately manipulates each of the spatially separated wavelength channels to selectively steer them with desired angles in the switching dimension. Specifically, the LCOS device 11 can steer the wavelength channels by an angle in the switching dimension relative to their respective originating common-port fiber that is approximately half the predetermined position of the add/drop fiber divided by the focal length of the cylindrical mirror 9. The importance of this switching angle will be discussed in detail below.

The wavelength channels are independently manipulated by the LCOS device 11 such that the channels are steered at a desired angle to be incident onto a steering element in the form of a 2-dimensional MEMS mirror array 13. The array includes one independently tiltable mirror corresponding to each add/drop fiber 5 for coupling the wavelength channels to respective add/drop fibers 5 for downstream use.

Referring still to FIG. 1, the multiplexed signals from the common-port fibers 3 are initially transmitted through a respective micro-lens of array 15, which acts to define a beam waist of the initially diverging beams emerging from the common-port fibers 3. In alternative embodiments, the functionality of the micro-lenses 15 can be replaced by suitable piezo/LCOS or collimator steering devices. The micro-lenses preferably have a focal length in the range 500 µm to 1 mm. However, micro-lenses having other specifications can be implemented depending on the system design. The multiplexed signals are then incident onto a Fourier transformer 17 for transforming the linear offset of the signals at the parallel common-port fibers 3 into an angular separation of the signals for propagation through the system.

Figure 2:
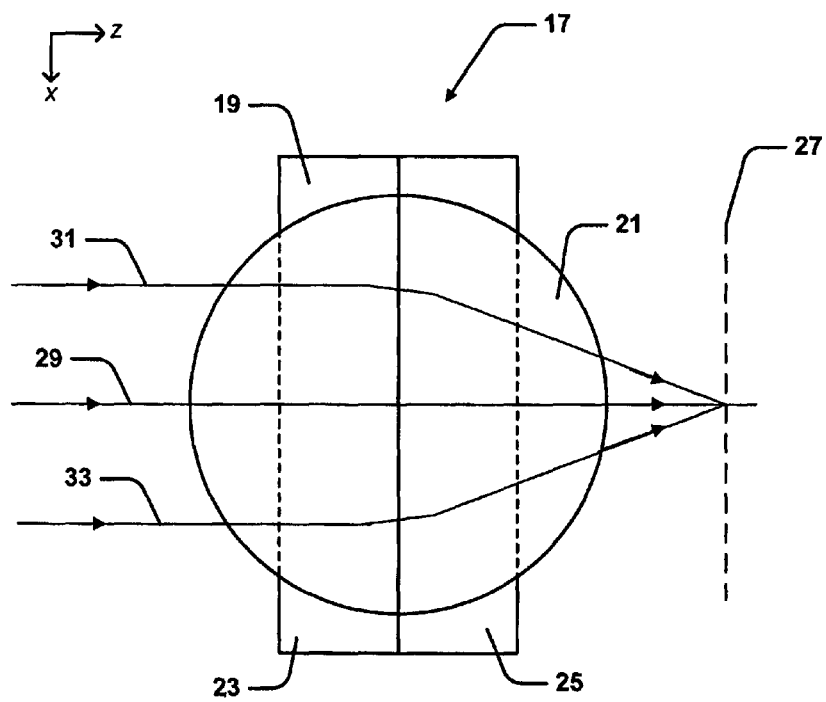
FIG. 2 is a top view of the Fourier transformer of the first embodiment for transforming an angle to a displacement.
Figure 3:
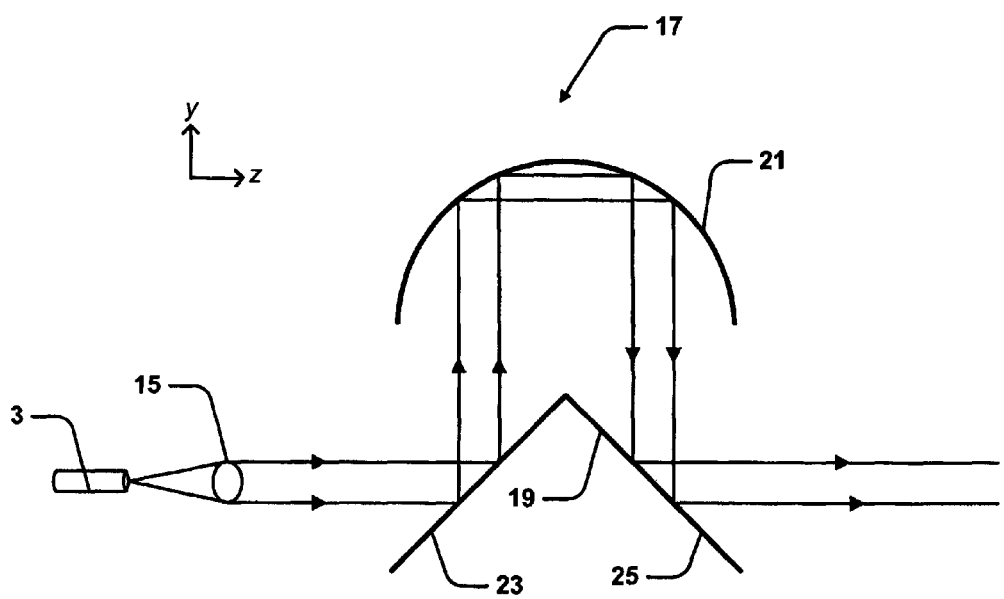
FIG. 3 is a side view of the Fourier transformer of FIG. 2.

Referring now to FIGS. 2 and 3, there is illustrated respectively a top view and side view of the Fourier transformer 17, which includes an inverted V-shaped angled reflector 19 situated below a hemispherical concave mirror 21. Signals are initially incident onto a first face 23 of the angled reflector 19 that is angled at about 45° in the y-z plane. Face 23 deflects the signals vertically onto the concave mirror. After reflection downward from mirror 21, the signals are incident onto a second 45° angled face 25 of the angled reflector 19 and reflected back along the optical z-axis of the system. The concavity of the mirror 21 angularly converges the signals to a point in a focal plane 27 at an optical path distance of about 15 mm from mirror 21. The angle of deflection of a signal depends upon its lateral position in the switching dimension. As shown in FIG. 2, a signal 29 passing through the centre of the Fourier transformer 17 (such as from a central fiber in array 3) is undeflected in the lateral dimension by the concave mirror 21. However, signals 31 and 33 incident onto outer regions of the Fourier transformer 17 (such as from peripheral fibers in the array 3) are angularly converged to focal plane 27. In effect, the linear position of the particular signal at the parallel input ports 3 is encoded as an angle of propagation through the multidirectional multiplexer 1. At the focal plane 27, where the beams cross, the width of the combined beam field is substantially equal to the width of a single beam prior to incidence onto the angled reflector 19.

The spherical concavity of the mirror 21 acts to angularly converge, the signals in both the dispersion and switching dimensions. The focal plane 27 defines a first point of symmetry in the multiplexer system. As shown in FIG. 1, a second point of symmetry is at the MEMS array 13. This symmetry ensures that the optical path length extending from the focal plane 27 to the LCOS device 11 is the same as the optical path length extending from the LCOS device to the MEMS array 13. The particular advantages of this symmetry will be made apparent in the description below.

While the angled reflector 19 is illustrated as a single unit, it will be appreciated that in alternative embodiments the two faces 23 and 25 of the V-shaped angled reflector 19 can be realized as two separate elements angled appropriately or a retro reflective configuration. In further alternative embodiments the Fourier transformer 17 is replaced by a converging lens having optical power in the switching dimension and optionally in the dispersion dimension.

Figure 4:
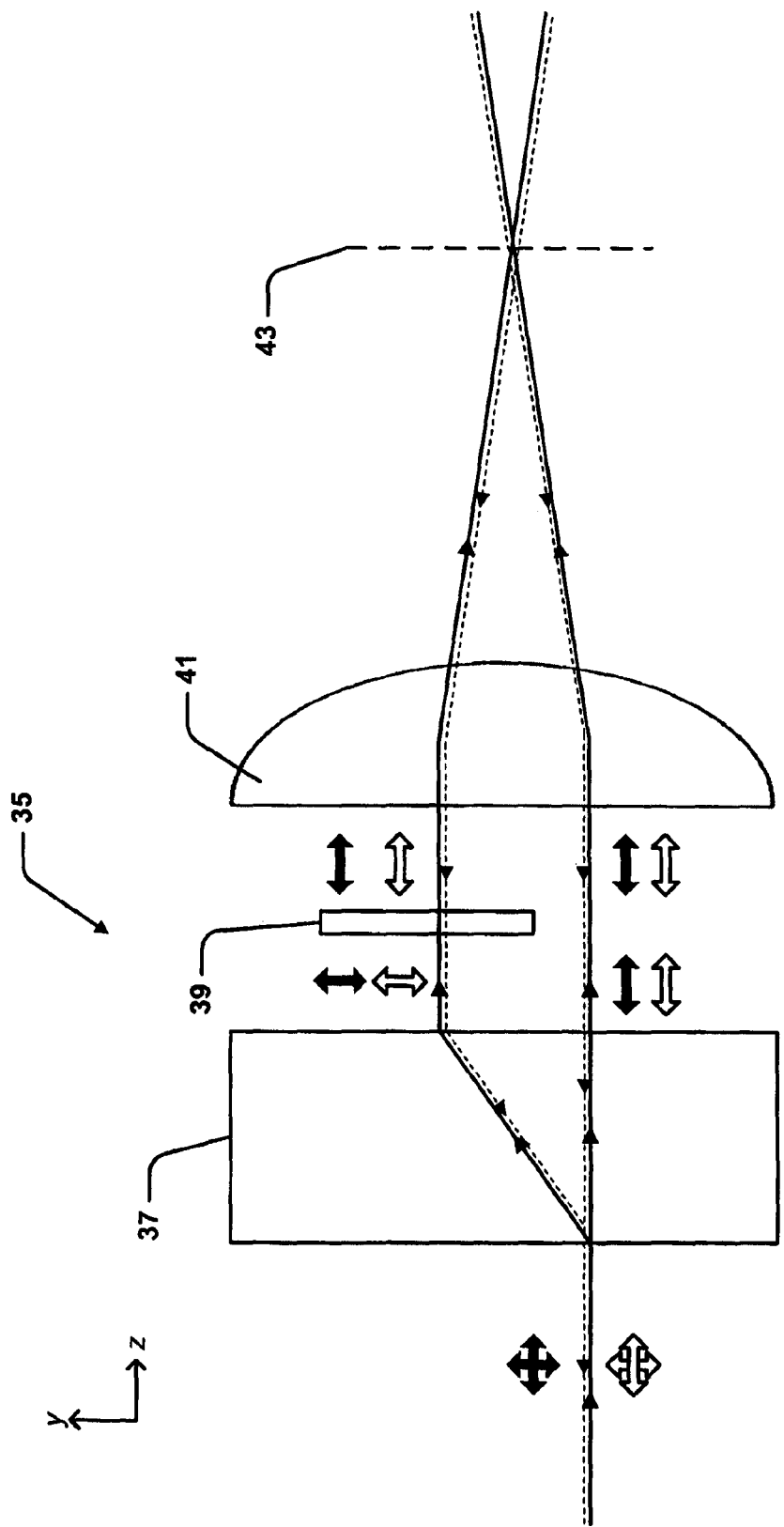
FIG. 4 is a side view of the polarization diversity system implemented in the first embodiment.

Returning to FIG. 1, the signals are next transmitted through a polarization diversity system 35 for compensation of polarization dependent effects of each optical signal. Turning now to FIG. 4, there is illustrated a side view of the polarization diversity system 35, which includes a walk-off crystal 37, half-wave plate 39 and a lens 41 having optical power in a vertical dispersion dimension. The optical signals propagate twice through the polarization diversity system 35—once in their multiplexed form in the forward direction (illustrated by the solid lines) and once in their wavelength separated form in the return direction (illustrated by the dashed lines) after traversing the grism 7 and LCOS device 11 of FIG. 1. The polarization diversity system 35 is configured such that the orthogonal polarization states of a signal are rotated into a common orientation and made to traverse a symmetric path through the multiplexer system. The components are recombined on their return path and rotated into their orthogonal orientations. The polarization components of the signals propagating in the forward direction are shown as solid arrows and the polarization components of the wavelength channels in the return direction are shown as outlined arrows.

Referring still to FIG. 4, the walk-off crystal 37 acts to spatially separate the two orthogonal polarization components on the first pass and recombine the components on the second pass. A preferred form of crystal 37 is comprised of Yttrium orthovanadate ($YVO_4$) and is about 2.5 mm in optical thickness, thereby providing about 250 μm of transverse separation between orthogonal polarization components upon output from the crystal. In the illustrated embodiment, the vertical horizontal component is walked vertically and the horizontal component remains undeflected in direction. However, it will be appreciated that the walk-off crystal can be configured to separate signals into orthogonal polarization components other than vertical and horizontal components. At the output of the walk-off crystal 37, the two orthogonal polarization components are separated and propagate with parallel trajectories. The vertical component traverses the half-wave plate 39, which flips the vertical component by 90° into the horizontal orientation. At this point in the z-axis both polarization components are in the same horizontal orientation. The lens 41 converges the paths of each polarization component to a point in a focal plane 43. In the preferred embodiment, lens 41 has a focal length of about 5 mm. This path ensures that, on the return trip (dashed lines), the originally horizontal component traverses the top path and is rotated into a vertical orientation by the half wave plate 39 before being recombined with the other component by the walk-off crystal 37. In this way, the polarization diversity system 35 ensures that both polarization components propagate through the system in the same state and are recombined, in orthogonal states, into a single signal for coupling to an add/drop fiber 5.

The polarization diversity system compensates for polarization dependent phenomenon such as polarization dependent loss (PDL). This is differential signal attenuation experienced between different polarization states due to the non-isotropic nature of various optical media. Such polarization dependent effects can degrade the performance of the multi-directional multiplexer.

In alternative embodiments, it will be appreciated that equivalent polarization diversity systems can be implemented using different arrangements of optical elements and can be situated at different locations within the optical system.

Referring again to FIG. 1, the optical signals are incident onto the cylindrical mirror 9 having optical power in the vertical dispersion dimension. This mirror 9 has a focal length of about 5 cm and acts to collimate each optical signal in the dispersion dimension. The signals are then transmitted through a cylindrical lens 45 having optical power in the horizontal switching dimension. The lens 45 has a focal length of about 20 cm and is situated several millimeters from the reflective grism 7. Signals reflected off the grism 7 again pass through lens 45. This double-pass of the lens essentially doubles the focusing power, and therefore halves the effective focal length of the lens to about 10 cm.

The focal lengths of Fourier transformer 17, cylindrical mirror 9 and lens 45 define the system dimensions. The Fourier transformer 17 provides a 4F (4 focal length) optical system utilizing the double-pass of lens 45. With the LCOS device 11 located halfway through the optical system, this ensures that the optical beams are parallel at the LCOS device 11. That is, the position of lens 45 in the system ensures that, following the two passes of the lens 45 in the forward direction, the optical signals are collimated in the switching dimension for parallel incidence onto LCOS device 11. On the return trip, the lens 45 focuses the signals to predefined spot sizes on respective MEMS mirrors 13. This focusing system including the cylindrical mirror 9 in the dispersion dimension and the double-pass of lens 45 in the switching dimension has an important advantage for switching to large numbers of fibers, which is described below.

Figure 5:
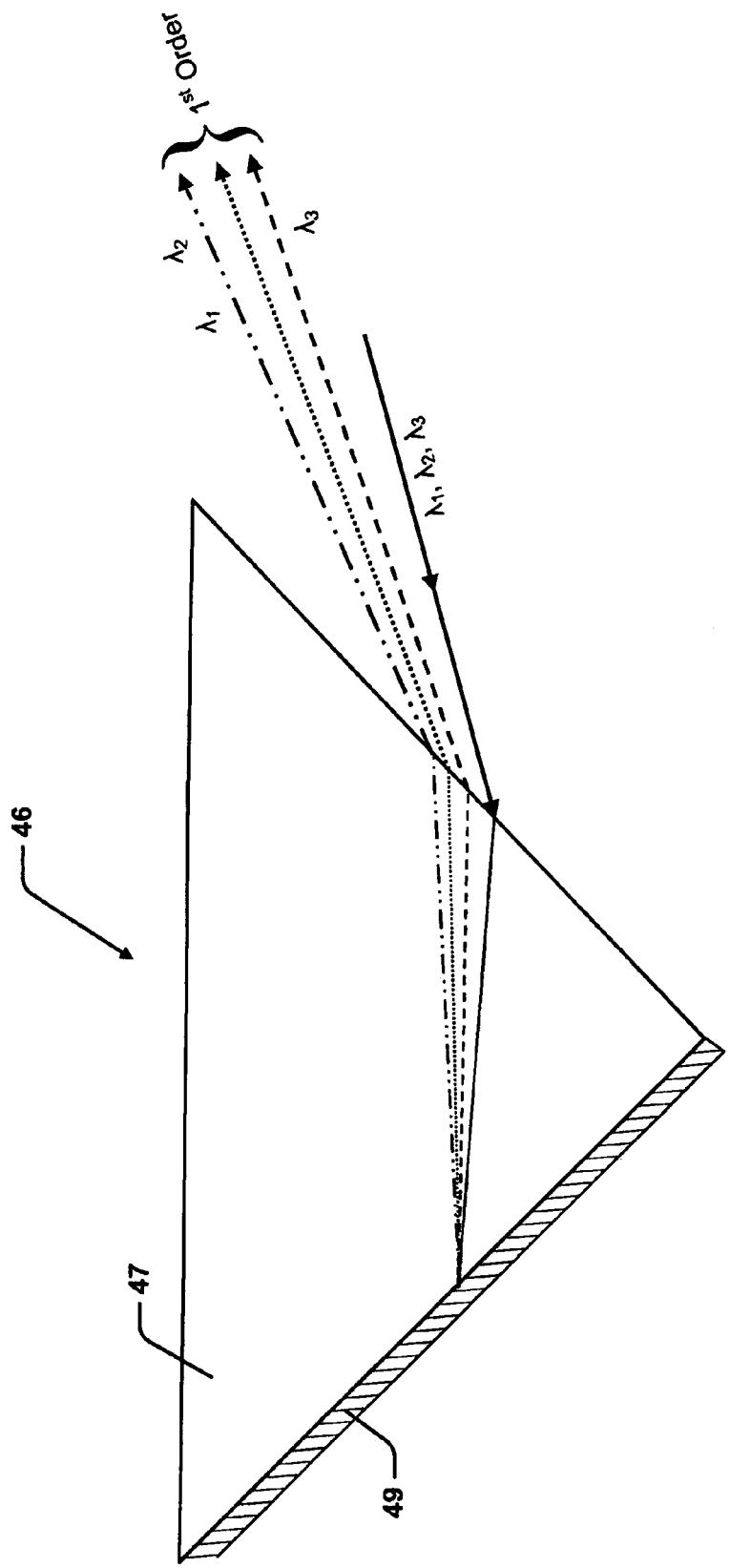
FIG. 5 is a lateral cross-section of a grism.

Referring now to FIG. 5, there is illustrated a lateral cross-section of a grism 46. This grism is similar in operation to that of grism 7 but configured in a different orientation to grism 7 for ease of description. The grism 46 simultaneously and independently diffracts each optical signal according to wavelength, thereby spatially separating the constituent wavelength channels in the dispersion dimension. The grism 46 is a compound element including a first region in the form of a wedge-shaped prism 47 and a second region in the form of a diffraction grating 49. The prism 47 defines two surfaces of the roughly triangular-shaped grism 46 and initially refracts the incoming optical beam onto the grating 49, which defines the third surface of the grism 46. The diffraction grating 49 then angularly disperses the beam, this time into separate output diffraction orders. Any directly reflected beam forms a so-called zero order and is not wavelength separated. However, each higher order (1st, 2nd etc.) includes angularly dispersed wavelengths, thereby spatially separating each channel included in the optical beam. Grism 7 and grism 46 are configured to operate at or near the Littrow angle in the $1^{st}$ order mode of operation. However, other diffraction order configurations are possible.

Similar to grism 7 of FIG. 1, the illustrated grism 46 is a reflection type grism wherein a reflection diffraction grating 49 is used. However, it will be appreciated that, through the use of a transmission-type diffraction grating, a grism can be operated in a transmission configuration.

Referring back to FIG. 1, following separation of the wavelength channels by the grism 7 and after a second pass of the lens 45, the signals are again incident onto the cylindrical mirror 9, which focuses the signals, in the dispersion dimension, onto the LCOS device 11. As mentioned previously, the LCOS device 11 separately manipulates each of the spatially separated wavelength channels to selectively steer the wavelength channels in the switching dimension. This process will now be described in greater detail.

Figure 6:
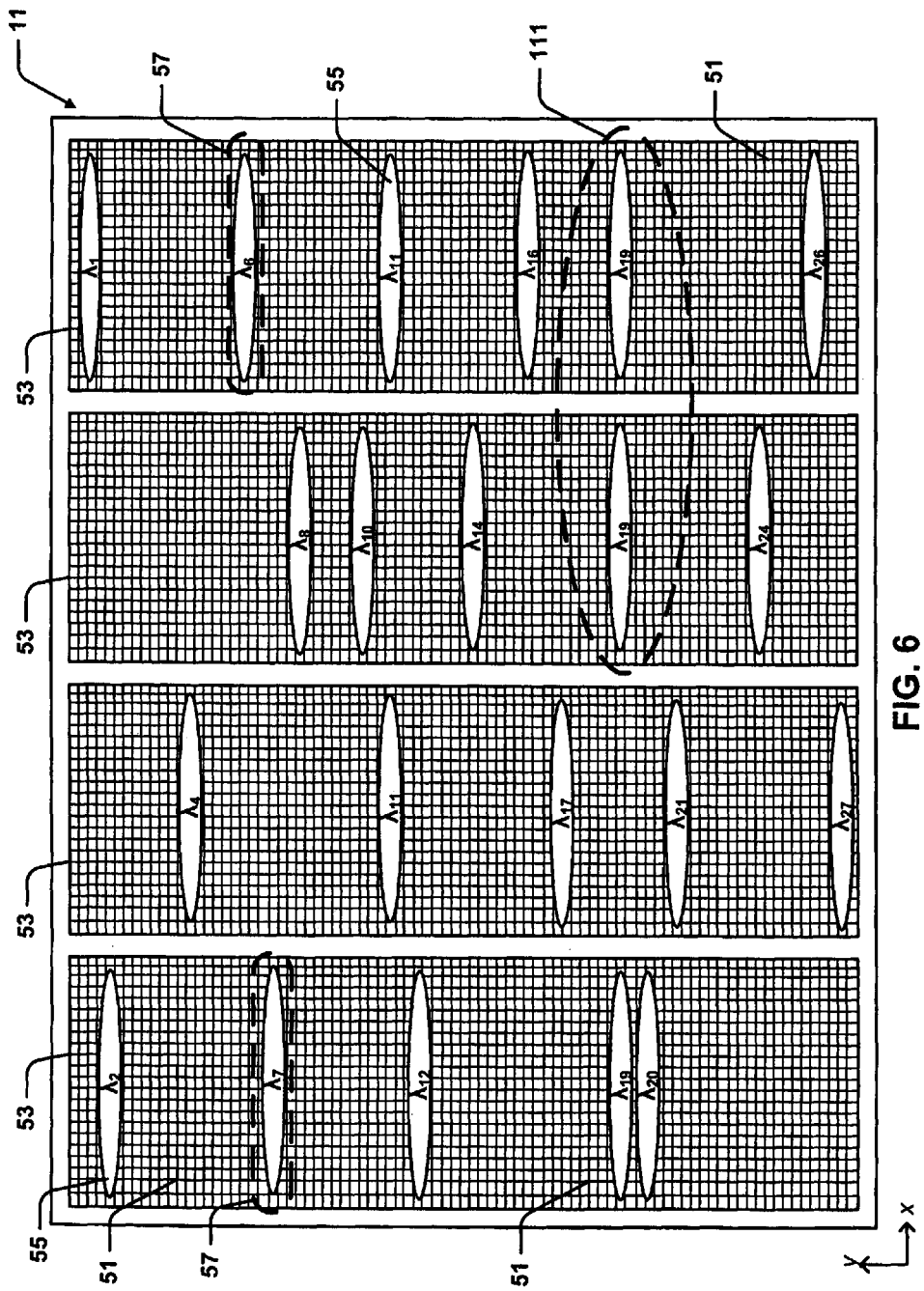
FIG. 6 is a front view of an LCOS device divided into four separate wavelength processing regions.

Referring now to FIG. 6, there is illustrated a front view of the LCOS device 11. This device includes a two-dimensional array of phase-manipulating pixels 51 which are independently controllable to collectively manipulate the local phasefront of the wavelength channels. The pixels 51 illustrated in FIG. 6 have been enlarged and reduced in number for clarity. In practice, the LCOS device 11 includes a large array of pixels, for example, 640×480 or 1400×1050 pixels.

The pixel array of the LCOS device 11 is programmable to be divided into horizontally separated wavelength processing regions 53, each configured to independently manipulate each of the spatially separated wavelength channels of an optical signal from a particular common-port fiber 3. The number of processing regions 53 is equal to the number of common-port fibers 3 in the multidirectional multiplexer. Therefore, as the number of common-port fibers 3 increases, more wavelength processing regions 53 are required from the finite amount of LCOS pixels 51 and fewer pixels are allocated to each region 53. However, it is possible to dynamically rescale the size of wavelength processing regions 53 to include more or less pixels 51. The number of common-port fibers 3 available for switching can be approximated by the available switching angle range divided by the numerical aperture of each optical beam spot. Switching availability is a primary consideration in up-scaling the multidirectional multiplexer to a larger number of fibers.

At the LCOS device 11, the wavelength channels are focused in the dispersion dimension and collimated in the switching dimension, thereby defining intensity profiles 55 that are highly elongate. Therefore, each channel is incident upon a significant number of pixels along the switching dimension to optimize beam steering and provide high wavelength resolution. The spatial separation of the wavelength channels by the grism 7 ensures that each channel falls onto spatially separated channel directing regions 57. Such regions are elongate regions of pixels 51 that are roughly the shape and size of the channel intensity profiles 55 and which can be electrically driven to independently selectively steer the wavelength channels in the switching dimension. By independently driving each of pixels 51 of a channel directing region 57 at a predetermined voltage, a desired phase profile can be established to selectively direct the channel in a predetermined direction.

Figure 7:
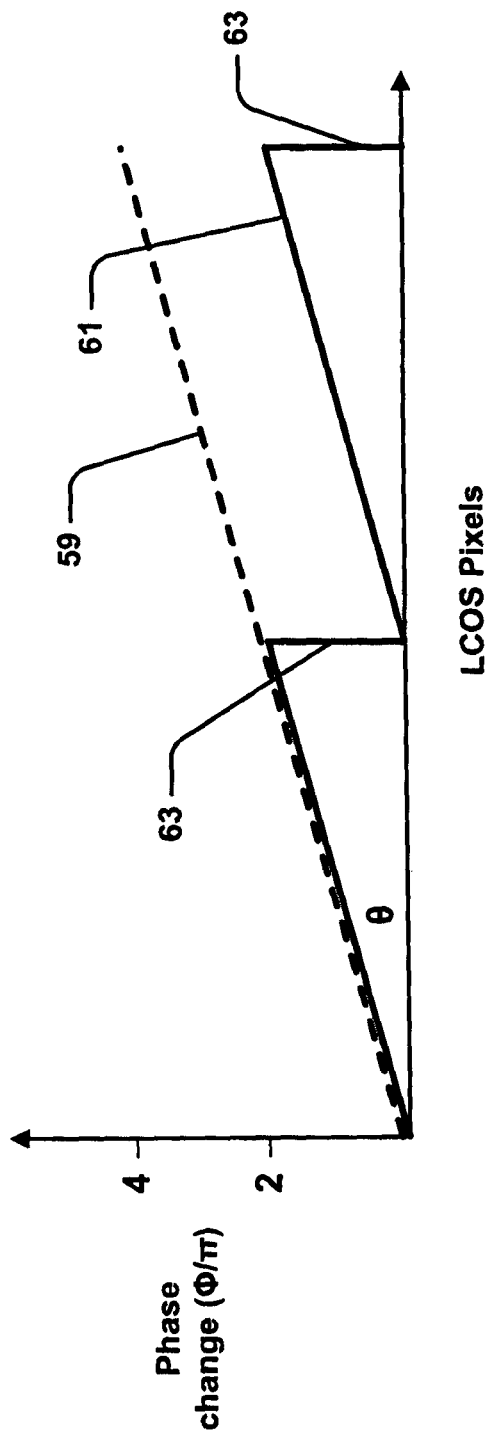
FIG. 7 is a graph of a first example phase profile set up across a channel direction region of the LCOS device.

Turning to FIG. 7, there is illustrated an example phase profile 59 set up along a channel directing region 57. The profile 59 is produced by driving each pixel 51 with a predetermined voltage to provide a desired phase change. In this simplified case, the input and output optical beams are treated as having linear wavefronts. In practice, other phase profiles can be constructed to steer arbitrary wavefronts. As there is a direct relationship between voltage and phase, and a direct relationship between phase and steering angle, a look-up table can be generated which relates the required voltage drive signal with a desired steering angle. Such a look-up table can be configured using software and can be reconfigurable.

The periodic nature of phase is utilized to reduce the required drive voltage. Therefore a periodic voltage signal 61 illustrated in FIG. 7 will produce the cumulative phase profile 59, where phase resets 63 occur at multiples of $2\pi$ radians. When acting on an incident wavelength channel, the phase profile 59 produces a steering angle proportional to $\theta$.

Figure 8:
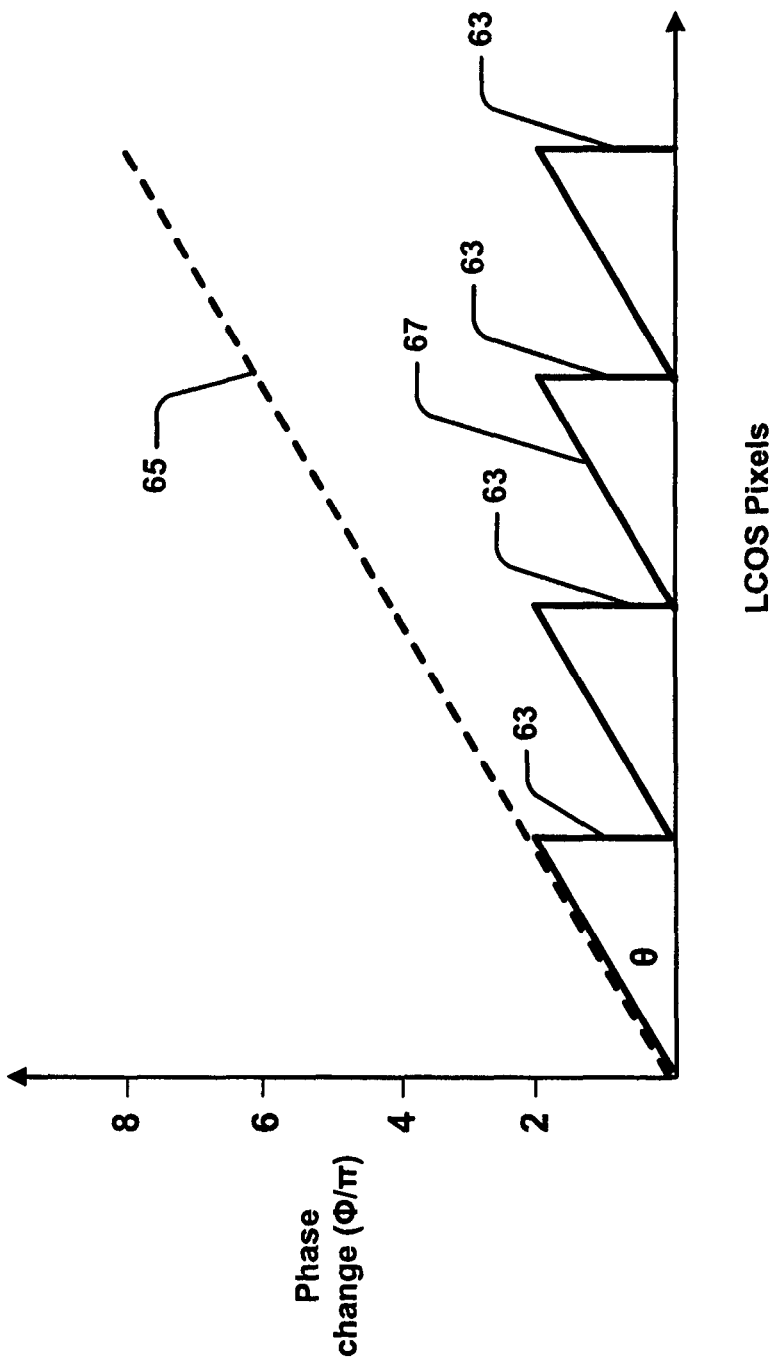
FIG. 8 is a graph of a second example phase profile set up across a channel direction region of the LCOS device.

Referring now to FIG. 8, another example phase profile 65 is illustrated. This profile 65 is produced by a saw tooth voltage signal 67 with steeper voltage increases than signal 61 of FIG. 7. Phase profile 65 has a steeper angle $\theta$ and therefore will steer incident channels at greater angles. However, more phase resets 63 are present to construct the steeper profile 65. In practice, phase resets 63 give rise to signal degradation. Therefore a minimum required loss limits the available beam steering that the LCOS device 11 can perform. This is an important consideration when the number of fibers becomes large.

Figure 9:
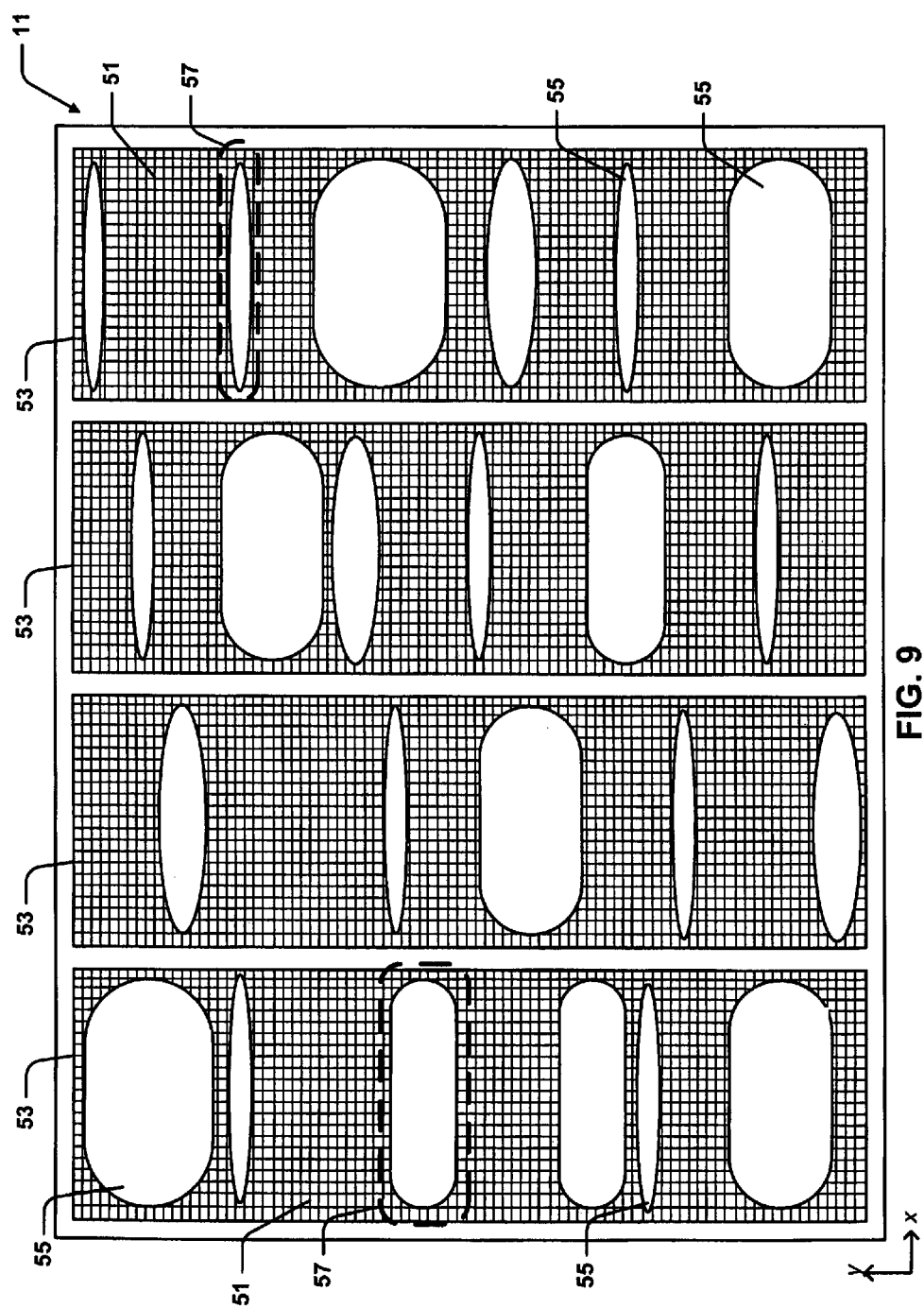
FIG. 9 is a front view of an LCOS device configured to steer wavelength channels having variable spectral width and spacing.

Referring back to FIG. 6, each wavelength channel of this embodiment has a common width and spacing. As will now be described, this need not be the case. Referring now to FIG. 9 there is illustrated a front view of the LCOS device 11 configured to manipulate channels having variable spectral width and spacing. This is achievable as the grism 7 transforms the spectral location to a spatial location and the pixels 51 of the LCOS device 11 are electrically drivable and software controlled. Therefore, the channel directing regions 57 can be spatially reconfigured by altering the drive signals to each pixel 51 to vary the number of LCOS pixels 51 allocated to each channel in the dispersion dimension. Such a flexible configuration is advantageous in routing channels in optical networks implementing a dual channel plan (50 GHz or 100 GHz channel spacing), a mixed channel plan (50 GHz and 100 GHz channel spacing) or other flexible channel plans. In this configuration, use of the LCOS device 11 permits the dynamic manipulation of flexible channel widths, for example, 12.5 GHz, 25 GHz, 50 GHz or 100 GHz channel widths.

Turning back to FIG. 1, after reflection from the LCOS device 11, the wavelength channels are coupled back through the optical system to a V-shaped angled reflector 71. The channels are incident onto a first surface 73 of reflector 71, which directs them downward onto respective MEMS mirrors of array 13. The MEMS mirrors are independently moveable to selectively reflect the wavelength channels in the switching dimension onto a second surface 75 of angled reflector 71 such that each wavelength channel is coupled to respective add/drop fibers 5. The MEMs array 13 includes one independently tiltable mirror corresponding to each add/drop fiber 5 and each mirror is typically rectangular shaped with dimensions in the order 250 $\mu m^2$ by 400 $\mu m^2$. However, it will be appreciated that MEMS mirrors having alternate shapes and sizes can be used. Two-axis arrays with large fill factor can preferably be used.

The desired MEMS mirror angle and LCOS device drive signals are electrically controlled by a routing control software system linked with the hardware devices. The control system uses inputs such as source and destination fiber and signal wavelength to dynamically set the path through the multidirectional multiplexer 1. Further, in embodiments permitting flexible wavelength channel widths and spacing, these parameters are also fed to the control system for correct configuration of the LCOS device 11.

Figure 10:
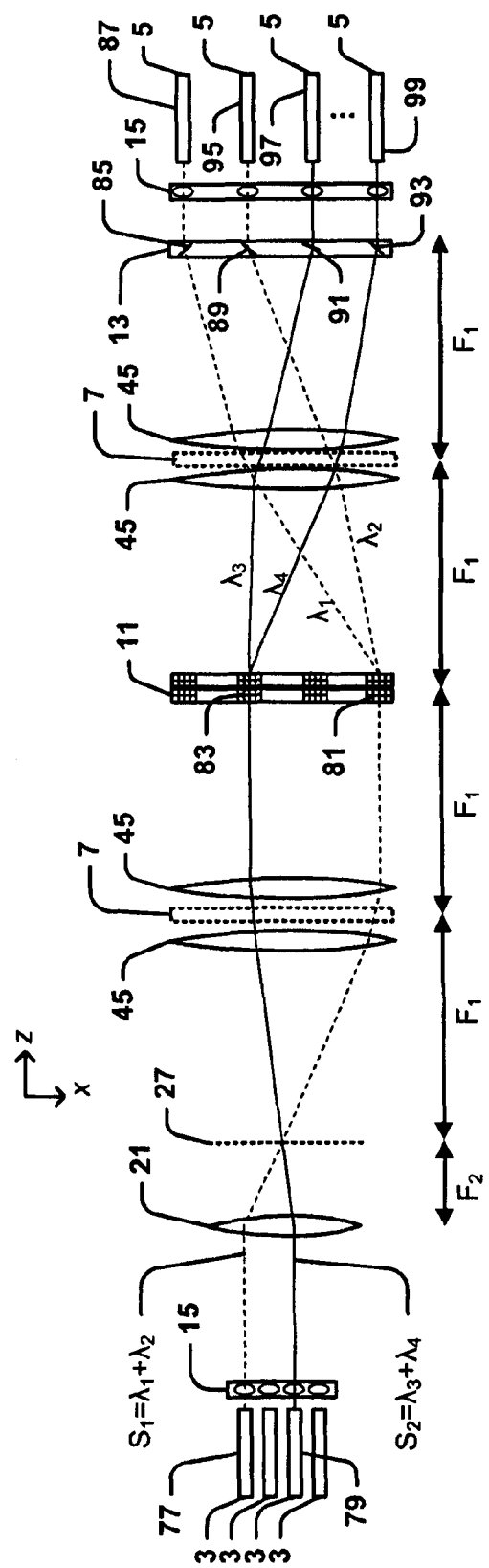
FIG. 10 is a conceptual schematic view of the first embodiment multidirectional multiplexer in the switching dimension.
Figure 11:
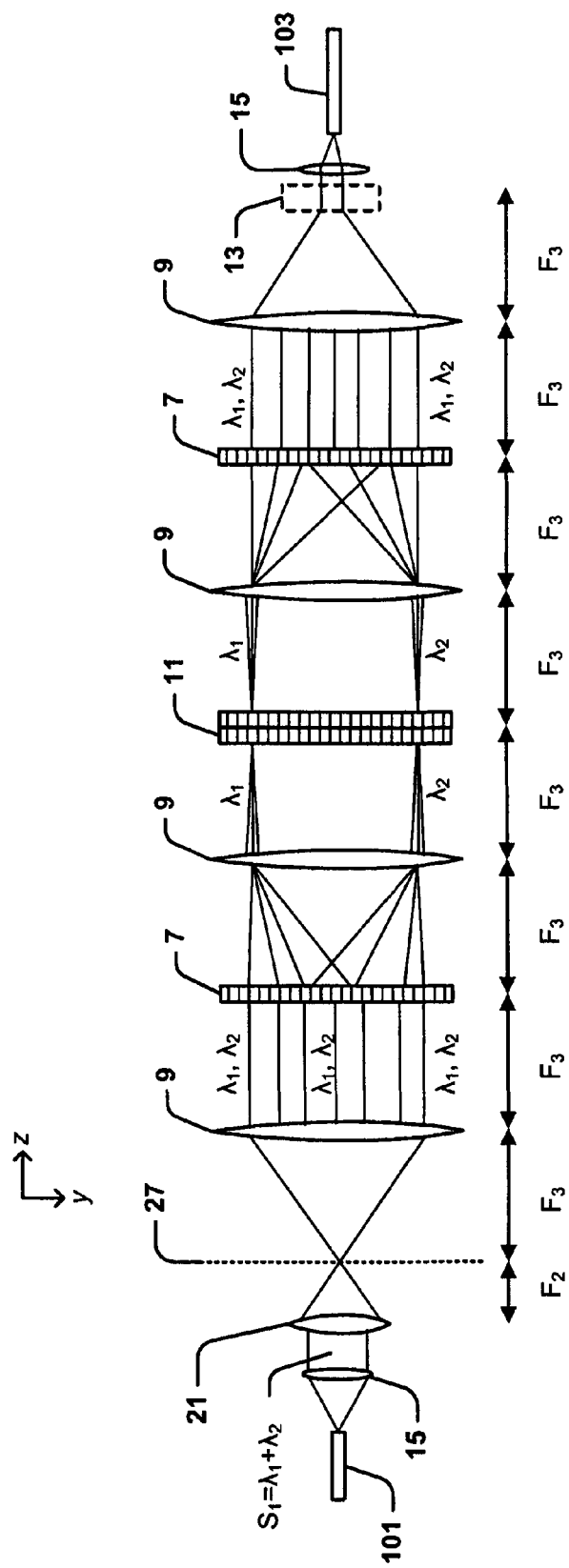
FIG. 11 is a conceptual schematic view of the first embodiment multidirectional multiplexer in the dispersion dimension.

Referring now to FIGS. 10 and 11, the switching operation of the multidirectional multiplexer 1 will now be described.

FIG. 10 schematically and conceptually illustrates the main elements of the multidirectional multiplexer 1 in the switching dimension, showing each element in a linear, transmission configuration for simplicity. FIG. 11 schematically and conceptually illustrates the main elements of the multidirectional multiplexer 1 in the dispersion dimension, again showing each element in a linear, transmission configuration for simplicity. In both FIGS. 10 and 11, sample rays are shown along selected paths from the common-port fibers 3 to the add/drop fibers 5. In FIG. 10, the grism 7 is shown with a dashed outline to indicate that it plays no direct part in the switching of wavelength channels in the switching dimension. Similarly, in FIG. 11, a MEMS mirror 13 is shown with a dashed outline to indicate that it plays no part in switching in the dispersion plane, at least in the illustrated embodiment. As will be described below, in alternative embodiments, the MEMS array 13 can be configured to also switch wavelength channels in the dispersion dimension.

Turning initially to FIG. 10, a first common-port fiber 77 inputs a first multiplexed signal $S_1$ (illustrated as a dashed line) including two wavelength channels $\lambda_1$, $\lambda_2$. Simultaneously, common fiber 79 inputs a second multiplexed signal $S_2$ (illustrated as a solid line) including two wavelength channels $\lambda_3$, $\lambda_4$. In practice, signals $S_1$ and $S_2$ will typically have a large number of wavelength channels, for example, 48 channels. Both signals $S_1$ and $S_2$ are focused to plane 27 by the spherical concave mirror 21 (illustrated here as a lens for simplicity in this conceptual diagram) and directed by two passes through lens 45 and a single pass through the grism 7 to corresponding wavelength processing regions 81 and 83 on the LCOS device 11. At this stage the wavelength channels of each signal $S_1$ and $S_2$ have been separated in the dispersion dimension by the grism 7. Wavelength processing region 81 selectively steers channel $\lambda_1$ back through lens 45 and grism 7 onto MEMS mirror 85 of array 13 for coupling to add/drop fiber 87. Similarly, channels $\lambda_2$, $\lambda_3$ and $\lambda_4$ are selectively steered to respective MEMS mirrors 89, 91 and 93, which respectively direct the channels to add/drop fibers 95, 97 and 99.

Turning now to FIG. 11, signal $S_1$ from FIG. 10 is output from common-port fiber 101 and is focused to plane 27 by the spherical concave mirror 21 (which, again is illustrated as a lens for simplicity in this conceptual diagram). Beyond plane 27, the signal $S_1$ is diverged and collimated by cylindrical mirror 9 onto grism 7. The two constituent wavelength channels $\lambda_1$, $\lambda_2$ are spatially separated by the grism 7 and directed back onto the cylindrical mirror 9, which focuses both channels onto the LCOS device 11. At this point, the LOCS device 11 performs channel switching in the vertical switching dimension and couples the switched channels back through the system to an add/drop fiber 103 in the switching dimension. As shown in FIG. 11, in the dispersion dimension, the wavelength separation process is symmetric about the LCOS device 11 between focal plane 27 and the MEMS array 13 such that the multidirectional multiplexer device 1 can operate as both a multiplexer and a demultiplexer. In this manner, the multiplexer can be described as being directionless in operation. It is noted that FIG. 11 does not differentiate the switching of wavelength channels between different vertically stacked add/drop fibers 5, which are shown in FIG. 10.

In both FIGS. 10 and 11, the spacing of each optical element is shown in terms of the focal length $F_1$ of the cylindrical lens 45 and the focal length $F_2$ of concave mirror 21 and $F_3$ the focal length of the cylindrical mirror 9. These schematic views clearly illustrate the symmetric nature of the system between the focal plane 27 and the MEMS mirrors 13, with the LCOS device 11 situated in the centre of the optical path.

In optical systems, such as the multidirectional multiplexer 1 of the present disclosure, it is often commercially desirable to reduce the overall scale size of each unit. This is generally achieved by minimizing the required path length of the optical system. Unfortunately, there exists a trade-off between path length and available switching angle. Generally speaking, a longer path length allows an optical signal to be switched to greater angle relative to its respective input fiber. Therefore, a larger path length is advantageous for switching to a larger number of fibers.

Figure 12:
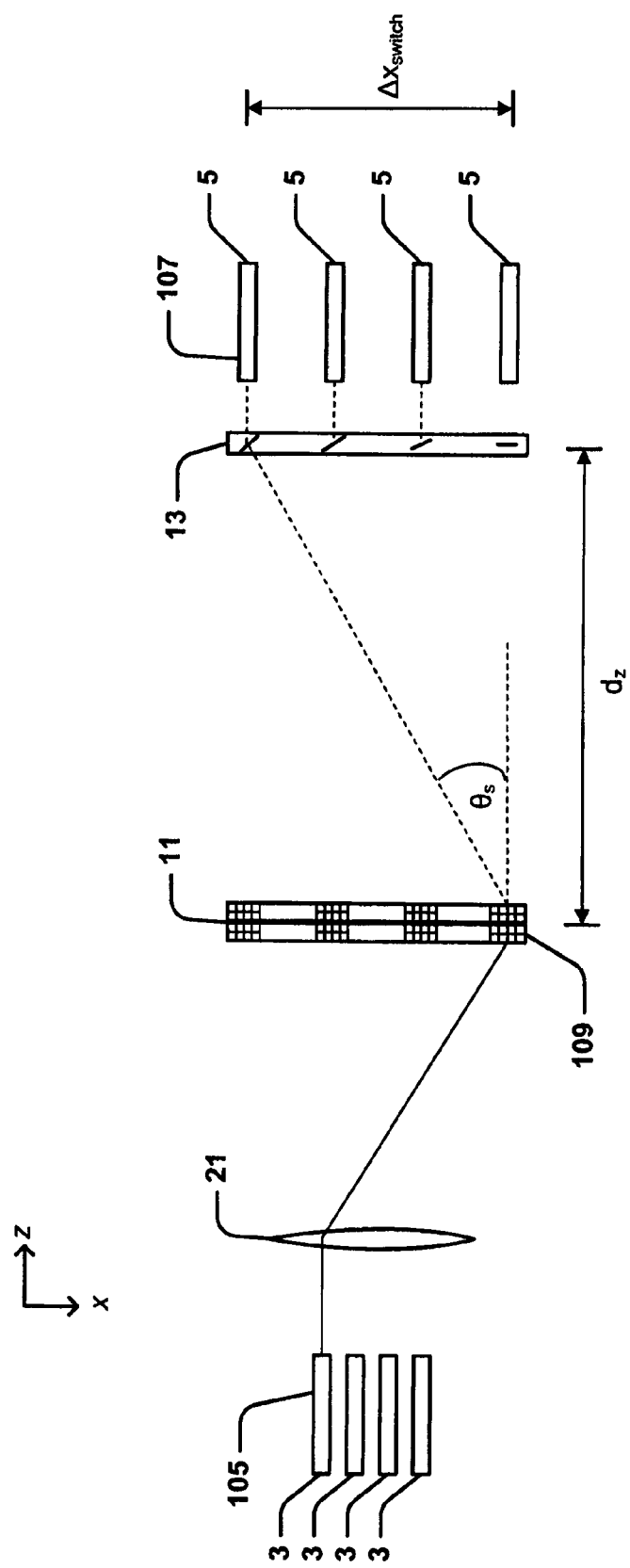
FIG. 12 is a simplified conceptual schematic view of the first embodiment multidirectional multiplexer in the switching dimension.

To illustrate the geometry and constraints of channel switching in the multidirectional multiplexer 1, FIG. 12 illustrates conceptually a simplified schematic view of the multiplexer in the switching dimension. In this drawing, only selected optical elements are shown for ease of understanding. The switching angle $\theta_s$ required to switch an optical signal from a particular common-port fiber 105 to an add/drop fiber 107 (or vice-versa) is defined by the relative axial offset $\Delta x_{switch}$ between the corresponding wavelength processing region 109 on the LCOS device 11 and the distance $d_z$. The lower constraint on $d_z$ is the requirement that the grism 7 is able to adequately spatially separate each wavelength channel in the dispersion dimension for steering by the LCOS device 11. In the embodiment of FIG. 1, this length is equal to about 5 cm—the focal length $F_3$ of the cylindrical mirror 9. This focal length is approximately half that of the effective focal length $F_1$ of the double-pass of lens 45. Therefore, the distance available for switching wavelength channels in the switching dimension is approximately double that of the required distance to separate the channels in the dispersion dimension. That is, $d_z = 2F_3$. The switching angle $\theta$ can be represented as:

$$\theta \approx \tan(\theta) = \frac{\Delta x_{switch}}{z} = \frac{1}{2}\frac{\Delta x_{switch}}{F_3}$$

where use is made of the small angle approximation. Put another way, the LCOS device 11 steers the wavelength channels by an angle in the switching dimension relative to their respective originating common-port fiber that is approximately half the predetermined position of the add/drop fiber divided by the focal length of the cylindrical mirror 9. Therefore, for a given available switching angle, the present multidirectional multiplexer architecture significantly increases the number of add/drop fibers 5 to which the wavelength channels can be efficiently coupled. This optimization is achievable as the switching angle ranges for all common-port fibers 3 are similar due to the parallel beams incident onto the LCOS 11 and the 2F switching arrangement of add/drop ports 5.

The LCOS device 11 provides wavelength dependent switching while the MEMS array 13 provides wavelength independent switching. This allows the switching angles of beams from add/drop fibers 5 to be switched at much greater angles by the MEMS array 13 than beams incident from the common-port fibers 3.

Figure 13:
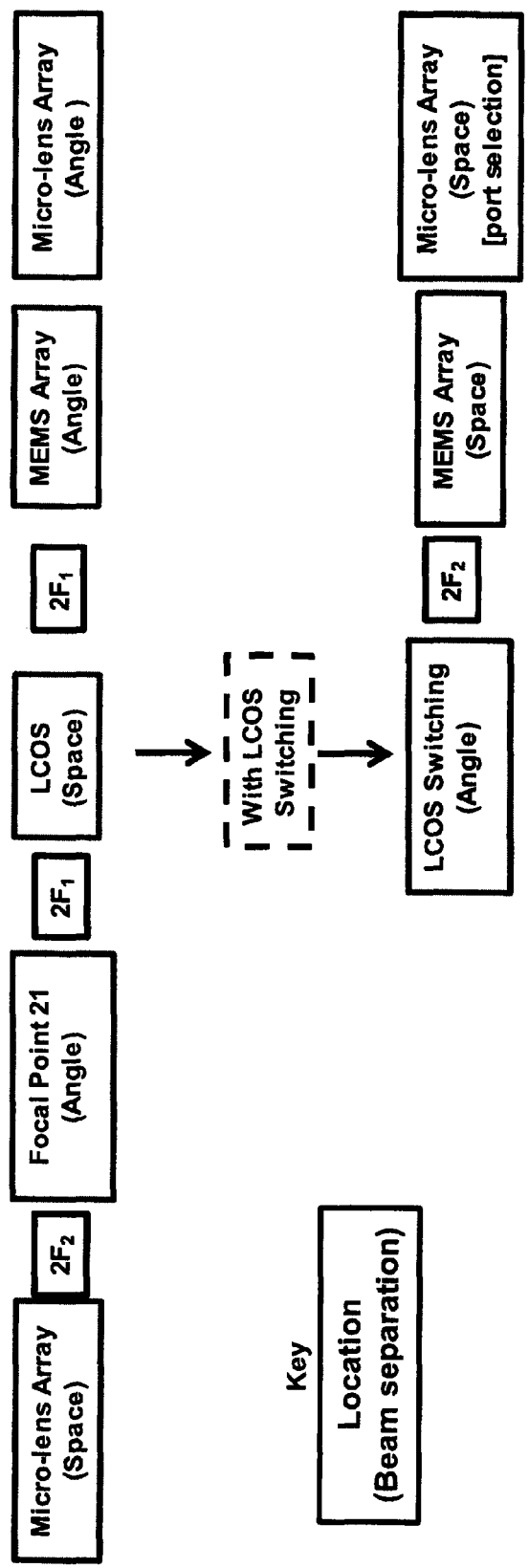
FIG. 13 is a block diagram illustrating the different separation characteristics of optical beams at specific points within the first embodiment multiplexer in the switching dimension.

The importance of the parallel common-port fibers 3 and optical layout of the multiplexer 1 can be understood with reference to FIG. 13, which illustrates a block diagram differentiating the propagation characteristics of optical beams at specific points within multiplexer 1 in the switching dimension. As indicated by the key, each block indicates a location within the optical system and the corresponding beam separation characteristic. The beams can be separated in either space or angle. Locations where beams are separated in space are designated by lightly shaded blocks.

By placing each element in the focal planes of the Fourier transformer 17 (having a focal length $F_0$, cylindrical mirror 9 (having a focal length $F_3$) and lens 45 (having a focal length $F_1$), the propagation of the optical beams can be translated between a spatial offset and an angular difference. The beams output from the common-port fibers 3 and micro-lens array 13 are spatially separated and propagating parallel to each other. The beams propagate through Fourier transformer 17 where they are angularly converged to focal plane 27, which is a distance of two focal lengths $F_0$ from the micro-lens array 15. At this point, each beam is confined to substantially the same spatial location but are encoded with a unique angle. After propagating a distance $2F_1$, the beams (as dispersed wavelength channels) are incident onto the LCOS device 11 as spatially separated beams. If no switching is performed by the LCOS device, the beams are reflected back through the system to the MEMS array 13, where a return through lens 45 translates the spatial separation to an angular separation. In this case, each beam would be confined to a point and no differentiation could be performed by the different MEMS mirrors.

In the operational situation where the LCOS device 11 performs switching of the beams, each beam is angularly encoded. Propagation through lens 45 on the return trip translates these angles to a corresponding spatial separation at the MEMS array 13. As each separated beam still has an angular component, the MEMS mirrors are required to steer the separated beams into corresponding add/drop fibers 5.

As mentioned above, the disclosed optical cross-connect device is reversible in that it can be used equivalently as a multiplexer or demultiplexer. While this multiplexing operation is essentially the reverse of the demultiplexing operation described above, for completeness the primary principles of the multiplexing operation will now be described with reference to FIG. 10.

Referring again to FIG. 10, add/drop fiber 87 inputs an optical signal at a predetermined wavelength $\lambda_1$, which, in an example case, is indicative of a single channel of information from an individual user to be carried along a long-haul optical fiber link. In some embodiments, the add/drop fibers 5 are configured to carry two or more channels. The channel $\lambda_1$ is transmitted onto MEMS mirror 85 corresponding to add/drop fiber 87. The MEMS mirror 85 is tilted at a predetermined angle set by the control system to direct the channel $\lambda_1$ to a desired processing region 81 of the LCOS device 11. The LCOS device 11 is configured to couple the wavelength channel $\lambda_1$ to an associated common-port fiber 77.

A primary difference between the multiplexing and demultiplexing operation is that, in the multiplexing operation, the MEMS mirrors 13 are the primary switching elements that determine the routing direction of each wavelength channel. The LCOS device 11 is configured to simply couple the channels to the associated common-port fibers. In the demultiplexing operation, the LCOS device 11 performs the active routing and the MEMS mirrors 13 perform the coupling to the add/drop fibers 5.

Although the embodiment illustrated in FIG. 1 shows a 4×16 multidirectional multiplexer, it will be appreciated that the operating principles described above can be applied to other configurations having different numbers of common-port fibers 3 and add/drop fibers 5. For example, in one particular embodiment an 8×20 multidirectional multiplexer is implemented having 8 common-port fibers 3 for multiplexed signals and 20 add/drop fibers 5 for inputting and outputting individual channel signals.

Additional Embodiments and Arrangements

Referring again to FIG. 6, the wavelength channels are incident onto the LCOS device 11 at predetermined locations depending upon their wavelength. The spatial position of each channel is determined by the angle at which the signals are incident onto the grism 7, and the resulting dispersion of the grism 7. Assuming a common incident angle, each channel having a common wavelength is incident on the LCOS device 11 at the same vertical position, albeit on different processing regions 53. This can give rise to regions 111 where two channels having the same wavelength are incident onto the same channel directing regions 57 of adjacent processing regions 53. Despite the spatial separation of each wavelength processing region 53, such a situation can give rise to coherent cross-talk between the coherent channels where the electric fields of one channel couple to the channel directing region 57 of the other channel.

Additionally, there is an inherent desire to increase the number of input and output ports in wavelength switching devices to increase network throughput. However, despite the efficient switching of the embodiment described so far, switching can be limited by the available steering angles of the LCOS device 11 and the scale size availability of the end device.

Figure 14:
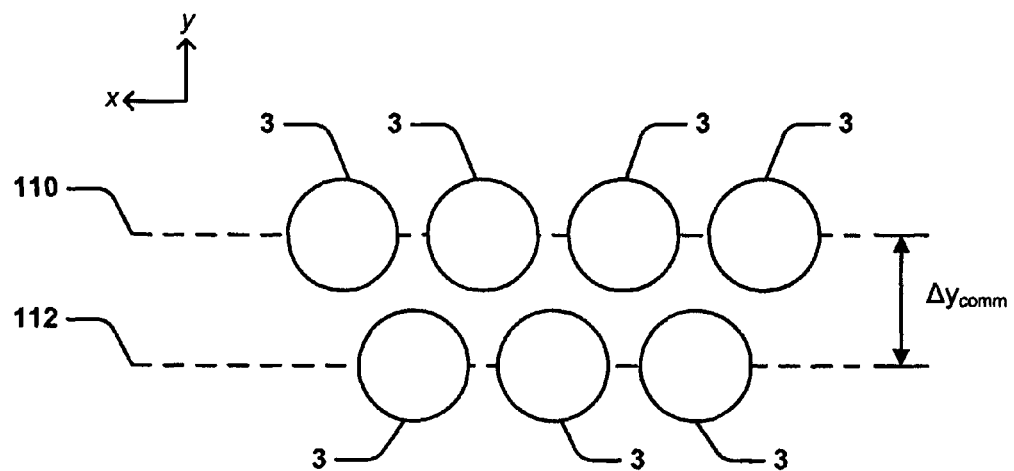
FIG. 14 is an expanded end view of an alternative configuration of common-port fibers.

To significantly increase the port count of the device, and to avoid regions 111 (to reduce the effects of coherent cross-talk), adjacent common-port fibers 3 can be offset with respect to each other in the dispersion dimension. Referring now to FIG. 14, there is illustrated an example common-port fiber configuration including two rows 110 and 112 of common-port fibers 3 displaced from one another in the dispersion dimension by an amount $\Delta y_{comm}$. Such a configuration can reduce the occurrence of undesirable channel positions (giving rise to regions 111), and also allows approximately twice as many common-port fibers 3 to be stacked along the switching dimension without substantially increasing the cross-talk experienced between the fibers. Similar configurations can be implemented with add/drop fibers 5.

Figure 15:
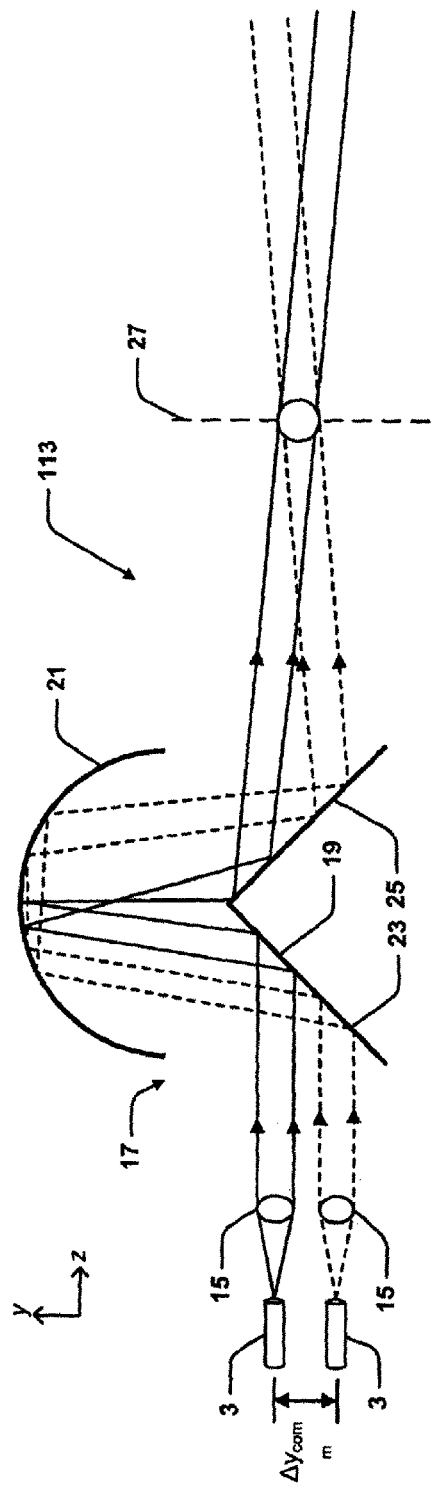
FIG. 15 is a sectional side view of an alternative embodiment multidirectional multiplexer showing two common-port fibers spatially separated in the dispersion dimension.

Referring now to FIG. 15, there is illustrated a cut-away side view of two common-port fibers 3 and Fourier transformer 17 of an alternative embodiment multidirectional multiplexer 113. In this embodiment, corresponding features are given the same reference numerals as in the first embodiment. In FIG. 15, the common-port fibers 3 are displaced in the dispersion dimension by a distance $\Delta y_{comm}$, such as in FIG. 14. This displacement translates to an angular offset through the Fourier transformer 17, and the two signals are focused to the same focal plane 27 as fibers 3 displaced in the switching dimension due to the spherical concavity of mirror 21.

Figure 16:
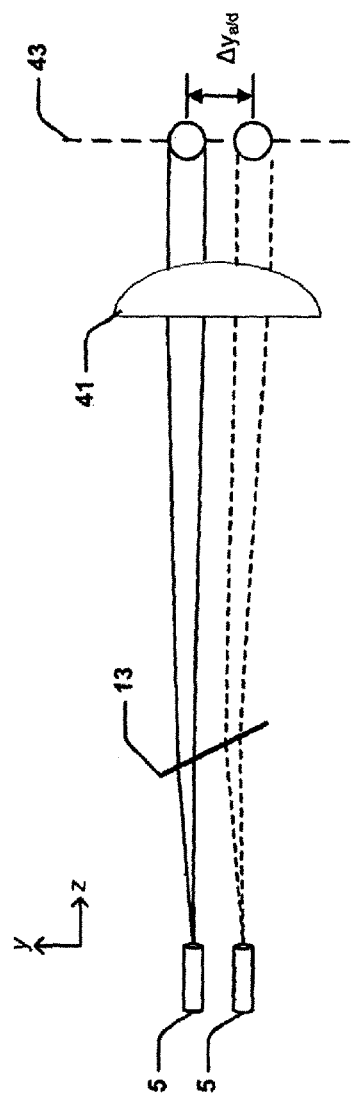
FIG. 16 is a sectional side view of an alternative embodiment multidirectional multiplexer showing two add/drop fibers spatially separated in the dispersion dimension.

Similar offsetting of fibers can be implemented at the add/drop fiber end. FIG. 16 illustrates a cut-away side view of two add/drop fibers 5 displaced in the dispersion dimension. This displacement translates to a beam separation of $\Delta y_{a/d}$ at the focal plane 43. It will be appreciated that, in some embodiments, both the common-port fibers 3 and add/drop fibers 5 can be offset in the dispersion dimension. In these embodiments, the common-port fiber offset distance $\Delta y_{comm}$ is preferably set different to the add/drop fiber offset distance $\Delta y_{a/d}$. For example, in one embodiment, $\Delta y_{comm} = 2\Delta y_{a/d}$.

Figure 17:
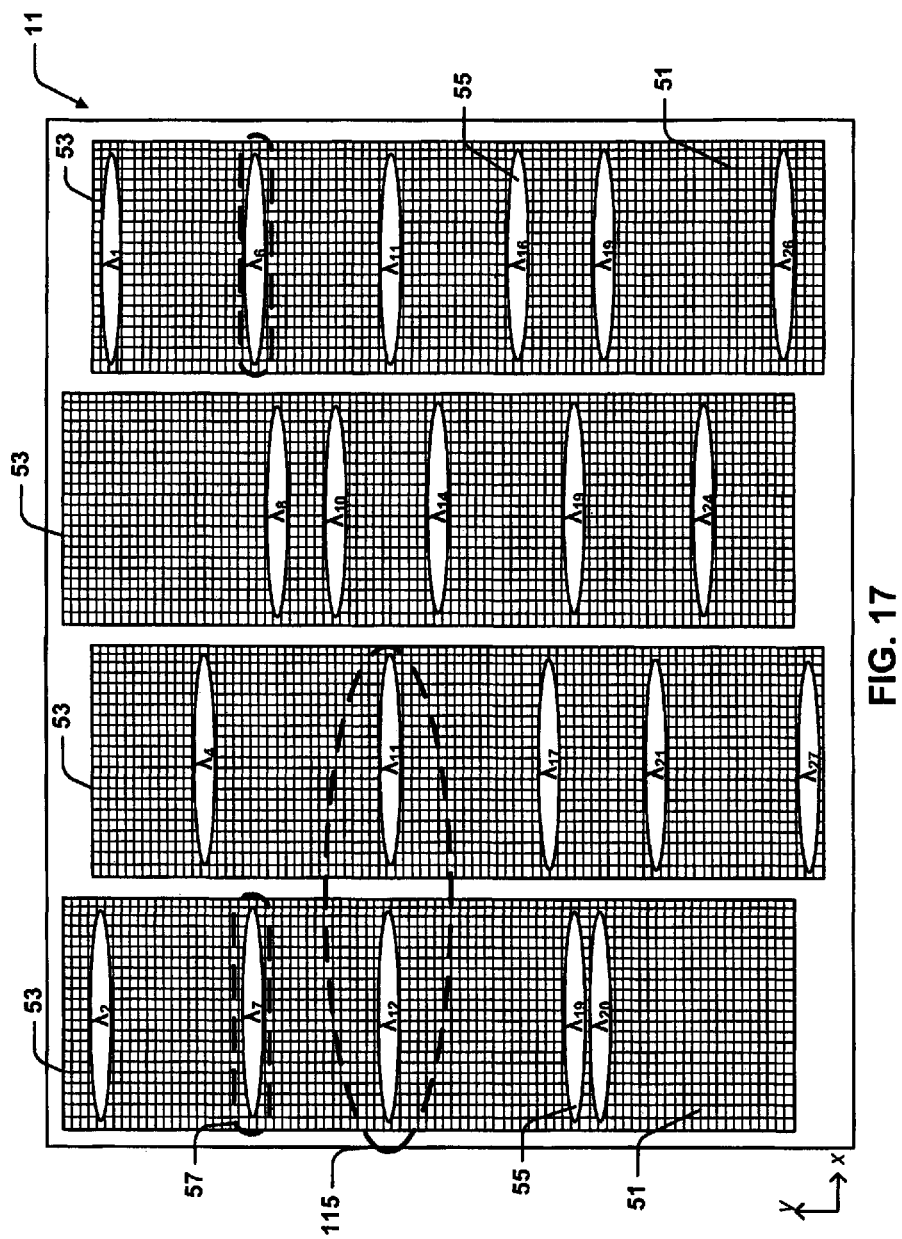
FIG. 17 is a front view of an LCOS device with adjacent wavelength processing regions vertically offset with respect to each other corresponding to an offset of common-port fibers in the dispersion dimension.

Referring to FIG. 17, there is illustrated a front view of the LCOS device 11 wherein adjacent wavelength processing regions are offset vertically with respect to each other by a distance of about one wavelength channel separation. This separation results from offsetting adjacent common-port fibers 3 as in FIG. 14. As shown in FIG. 17, there are now no instances of wavelength channels having common wavelengths falling on corresponding channel directing regions 57 of adjacent processing regions 53. Accordingly, the electric fields of the coherent channels are less strongly coupled and the effects of coherent cross-talk are reduced. While regions 115 can occur where wavelength channels fall on corresponding channel directing regions 57 of adjacent processing regions 53, the adjacent channels are no longer coherent. Therefore, coherent cross-talk is significantly reduced.

In order to switch signals to fibers offset in the dispersion dimension, the MEMS mirrors 13 must be configured to also steer the signals in that dimension. Referring again to FIG. 1, the MEMS mirrors 13 tilt about the z-axis to direct the optical signals in the switching dimension and to select a desired processing region 53 of the LCOS device 11. In embodiments where common-port fibers 3 are offset in the dispersion dimension, such as in FIG. 14, the MEMS mirrors 13 can also tilt about the x-axis to provide directional control in the dispersion dimension. In other embodiments, different arrangements of common-port fibers 3 and add/drop fibers 5 can be adopted to increase the number of fibers accessible for a given available LCOS switching angle. In particular, it will be appreciated that, with appropriate control of the MEMS mirrors 13, either or both of the common-port fibers 3 or add/drop fibers 5 can be offset in the dispersion dimension as well as the switching dimension.

In an alternative embodiment, the common-port fibers 3 and add/drop fibers 5 can be angled with respect to each other as an alternative means for reducing cross-talk. This angular difference causes corresponding wavelengths of different common-port fibers 3 to be dispersed at different angles by the grism 7 and subsequently incident on the LCOS device 11 at slightly offset positions with respect to each other. In further alternative embodiments, the common-port fibers 3 and add/drop fibers 5 can be both offset and angled with respect to each other.

Figure 18:
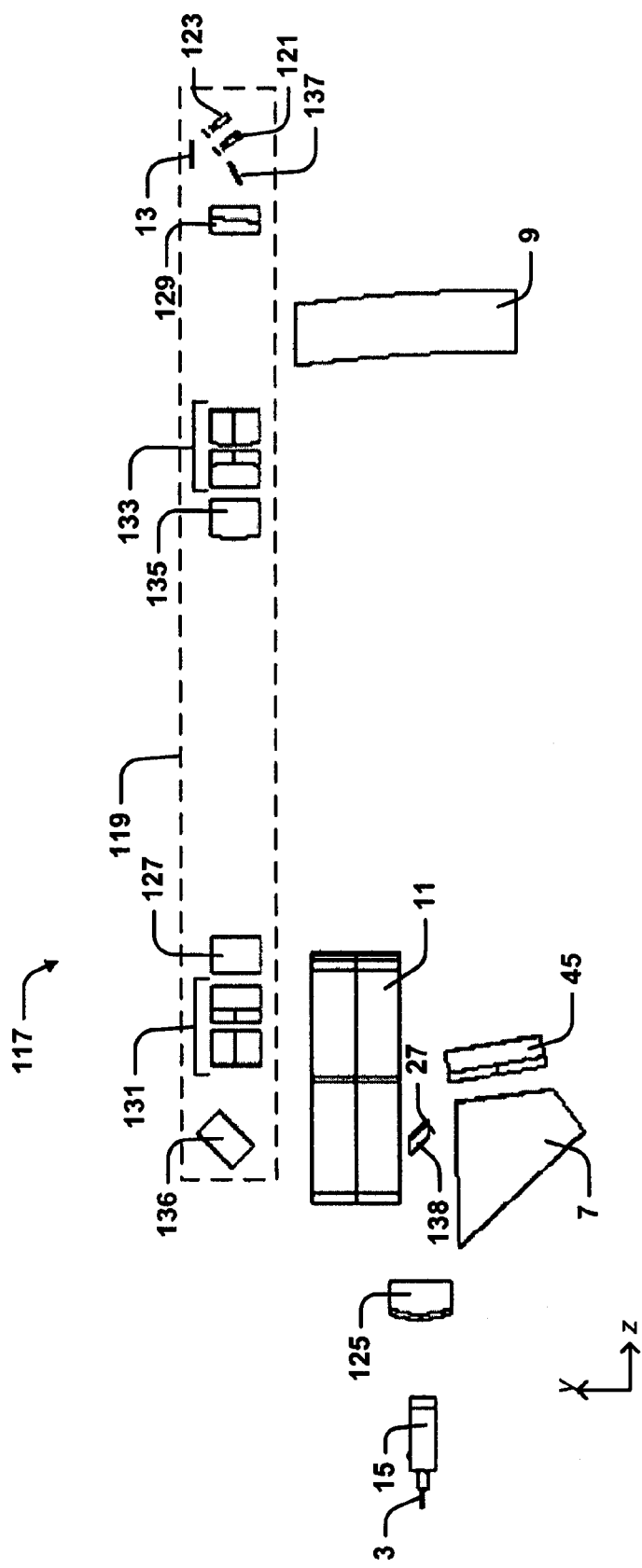
FIG. 18 is a schematic top view of a second embodiment multidirectional multiplexer, having capability to switch between fibers in both the switching and dispersion dimensions.
Figure 19:
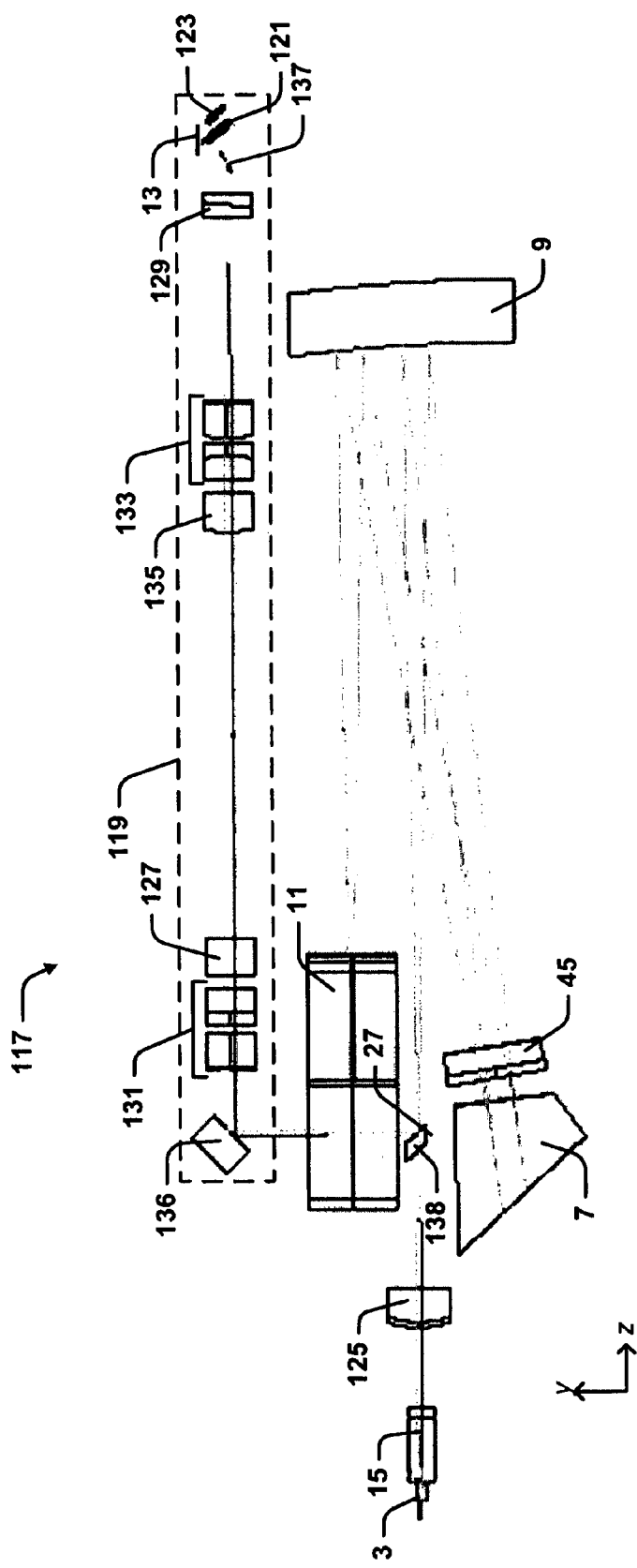
FIG. 19 is a schematic top view of the second embodiment multidirectional multiplexer showing a ray trace of optical beams through the system from a common-port fiber to an array of add/drop fibers.

Two-dimensional switching can be difficult to implement in practice, particularly in realizing the physical arrangement of optical components. Referring now to FIGS. 18 and 19, there is illustrated a schematic view of an alternative embodiment multidirectional multiplexer 117. FIG. 19 shows the multiplexer with rays indicating the propagation of optical beams through the optical system. This embodiment performs essentially the same functions as multiplexer 1 but includes an additional extended optical path 119, which provides more flexibility to perform switching in the dispersion dimension. Multiplexer 117 also includes two arrays 121 and 123 of add/drop fibers 5, for example, in arrays as set out in FIG. 14 for common-port fibers 3, which are disposed at the end of optical path 119, together with the MEMS array 13. From a design perspective, multiplexer 117 provides increased flexibility for varying the path length to adjust for aberrations and can be suitable for inserting optical elements such as a polarization diversity system.

As with multiplexer 1 of FIG. 1, multiplexer 117 includes an array of common-port fibers 3 with corresponding microlenses 15, cylindrical lens 9, lens 45, grism 7, LCOS device 11 and MEMS array 13. In multiplexer 117, the Fourier transformer takes the form of a single lens 125, which performs the same function—to convert a spatial offset to an angular difference. The polarization diversity system of multiplexer 117 includes a half-wave plate 127 and birefringent wedge 129. Wedge 129 two opposing elements tapered in width and having opposite birefringent properties. In one embodiment, wedge 129 is formed of Yttrium orthovanadate. As the function of this polarization diversity system is similar to that of system 35, its operation will not be described.

Optical path 119 also includes two lens pairs 131 and 133 and may include other optical elements. The length of optical path 119 is defined by the focal lengths of each lens pair 131 and 133. In alternative embodiments, lens pairs 131 and 133 can be replaced by single lenses with appropriate optical power. In the illustrated embodiment, lens pair 131 has a combined focal length $F_4$, which is equal to the combined focal length of lens pair 133. Further, the optical power of lens pairs 131 and 133 is equal in both the switching and dispersion dimensions. These lenses thereby define a 4F system along the optical path 119 making the optical path symmetric between focal point 27 and MEMS array 13. This symmetry ensures that any angular difference or spatial displacement of beams at focal point 27 translates directly to a corresponding angular difference or displacement at the MEMS array 13. In alternative embodiments, lens pairs 131 and 133 can be replaced by other optical elements, including single lenses with appropriate optical properties.

It will be appreciated that optical path 119 can be made an arbitrary length using arbitrary numbers, types and positions of optical elements, provided that the optical beams are spatially separated in the switching dimension at the MEMS array 13 for coupling to add/drop fibers 5. Lens 135 can be placed in the optical path to provide additional optical power for adjusting the focal point along the z axis in the switching dimension and/or dispersion dimension. In different embodiments, lens 135 may not be necessary.

For practical implementation, mirror 136 is provided to orient the optical path 119 parallel to the remaining optical system. This is intended to reduce the scale size of the system for implementation into a device for end-use. It will be appreciated that path 119 can be oriented in other directions. Similarly, mirror 137 is used to direct the beams onto MEMS array 13 for practical implementation purposes. It will similarly be appreciated that in alternative embodiments this mirror may not be required.

Figure 20:
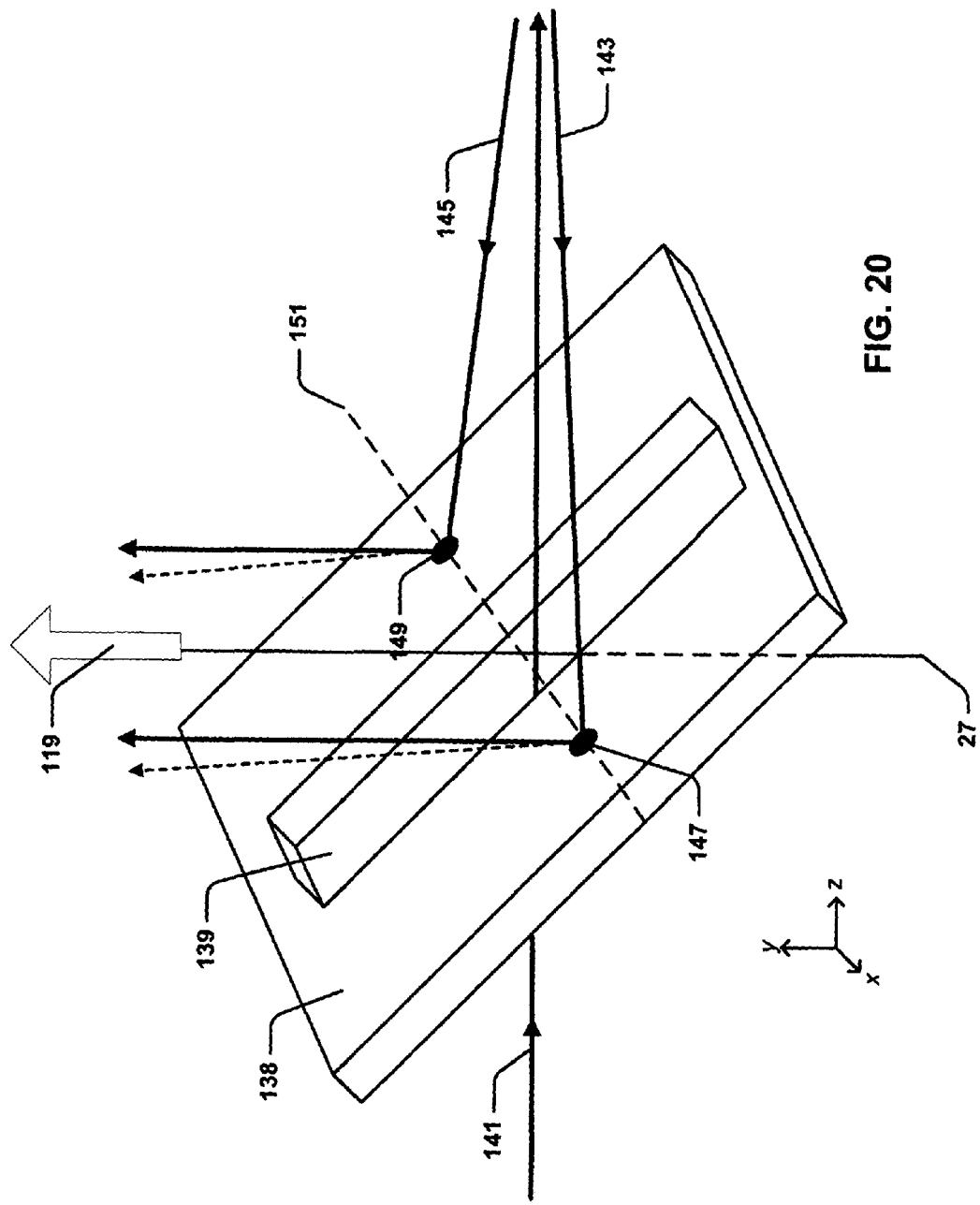
FIG. 20 is a perspective view of an angled mirror implemented in the second embodiment, the mirror having an aperture for transmitting beams incident from common-port fibers and redirecting beams steered by the LCOS device.

Referring now to FIG. 20, optical beams are directed along optical path 119 of multiplexer 117 by a directional beam separating element in the form of an angled mirror 138 with an aperture 139. While the mirror 138 and aperture 139 are illustrated as being rectangular, in alternative embodiments, these can take the form of other shapes. Mirror 138 is located at focal plane 27 of lens 125 where the beams converge thereby reducing the necessary size of aperture 139 and mirror 138. As illustrated in FIG. 20, a beam 141 incident from common-port fibers 3 is transmitted through aperture 139 and directed to the LCOS device 11. Selective switching by the LCOS device 11 angularly encodes each beam in the switching dimension such that, on the return trip, beams 143 and 145 are incident onto corresponding regions 147 and 149 of mirror 138 depending on the angle of switching. Due to a second pass through grism 7, all wavelength channels are refocused to a plane 151 on mirror 138. However, if switching in the dispersion dimension has been applied by the LCOS device 11, at regions 147 and 149, wavelength channels will have an angular difference. Therefore, after reflection from mirror 138, beams corresponding to wavelength channels will angularly separate depending on the switching applied by the LCOS device 11.

Mirror 138 is preferably tilted at an angle of about 45° with respect to the optical z axis such that beams 143 and 145 are directed along path 119, which is in the dispersion dimension. However, it will be appreciated that optical path 119 can be disposed in other directions by appropriate orientation of mirror 138.

Figure 21:
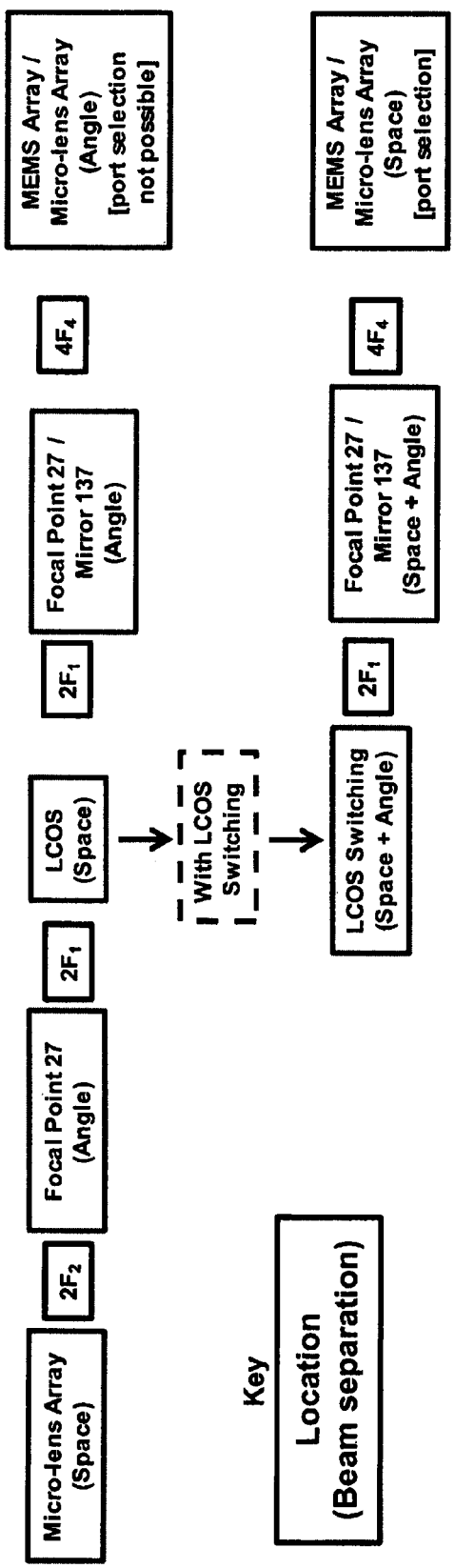
FIG. 21 is a block diagram illustrating the different separation characteristics of optical beams at specific points within the second embodiment multiplexer in the switching dimension.
Figure 22:
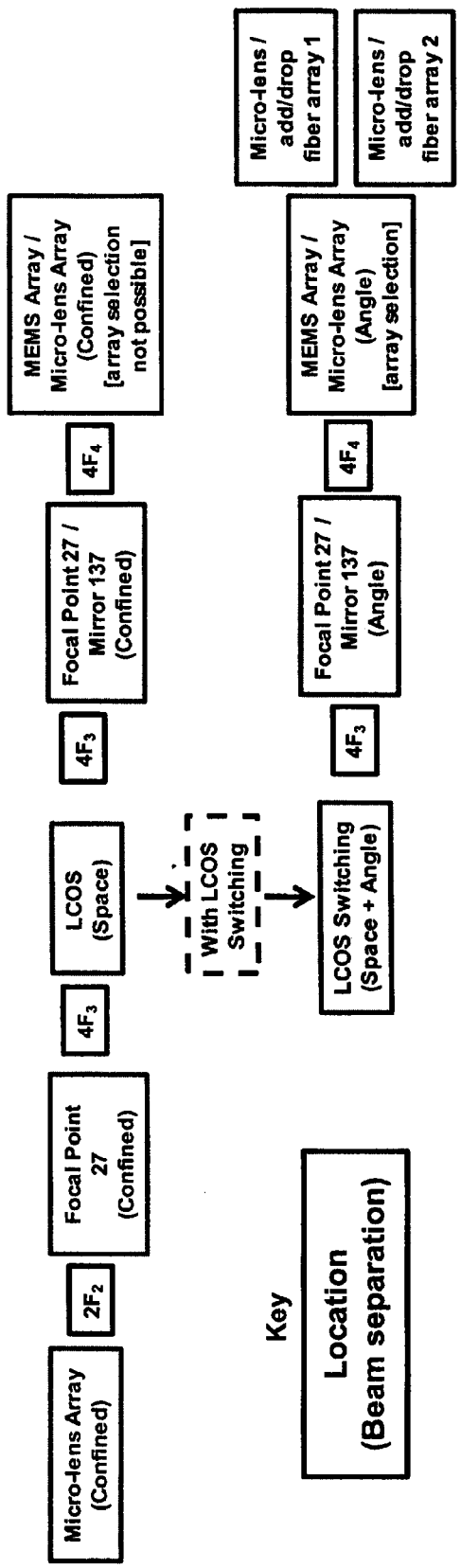
FIG. 22 is a block diagram illustrating the different separation characteristics of optical beams at specific points within the second embodiment multiplexer in the switching dimension.

To illustrate how multiplexer 117 provides switching in the dispersion dimension, reference is now made to FIGS. 21 and 22, which illustrate block diagrams of the different separation characteristics of optical beams at specific points within multiplexer 117. FIG. 21 indicates the beam separation characteristics in the switching dimension and FIG. 22 indicates the beam separation characteristics in the dispersion dimension.

Referring initially to FIG. 21, a number of similarities to FIG. 13 are observed. In particular, the beams are initially spatially separated at the micro-lens array 15, based on the layout of the common-port fibers 3. Lens 125 performs a similar function to Fourier transformer 27 in angularly converging the beams to focal point 27. Appropriate placement of lens 45 ensures that, at the LCOS device 11, the beams are again spatially separated in the switching dimension. By applying selective switching by the LCOS device 11, each wavelength beam is angularly encoded, as well as being spatially separated.

The angular separation translates to a spatial separation at mirror 138 such that each beam strikes regions 147 and 149 of the mirror outside aperture 139. This directs the beams to path 119 and through the 4F system to the MEMS array 13. Here the wavelength beams are spatially separated in the switching dimension and are incident onto respective MEMS mirrors. The MEMS mirrors compensate for the different angles of the wavelength beams carried through the system from the spatial separation at the LCOS device 11. Without angular switching by the LCOS device, the beams are angularly converged to a spot at the MEMS array 13, thereby preventing switching by the different MEMS mirrors.

Therefore, the addition of the optical path 119 does not significantly change the steering process in the switching dimension. Referring now to FIG. 22, in the dispersion dimension, beams are initially confined until they are angularly separated by the grism 7, which is located a distance $2F_3$ after the focal point 27. This angular separation translates to a spatial separation at the LCOS device 11. The LCOS device 11 can be programmed to switch in the dispersion dimension as well as the switching dimension. If no switching is applied in the dispersion dimension, the wavelength beams are angularly and spatially recombined by the grism. This allows no steering in the dispersion dimension. However, if the LCOS also steers the wavelength beams in the dispersion dimension, the beams will be incident on the mirror 138 with different angles. This angular difference at mirror 138 translates to a corresponding angular difference at the MEMS array 13, which allows the MEMS mirrors to steer wavelength beams between one of the two arrays 121, 123 of add/drop fibers 5.

By performing the procedure described above, individual wavelength channels can be routed from any common-port fiber 3 to any one of the output fibers 5 in array 121 or 123. It will be appreciated that the particular layout of optical path 119 is only one way of providing practical switching in the dispersion dimension as well as the switching dimension.

CONCLUSIONS

It will be appreciated that the above disclosure provides an improved wavelength selective switch for efficiently and reconfigurably routing wavelength channels from a plurality of input ports to a plurality of output ports in a spectrally flexible manner.

The multidirectional multiplexer includes a dynamically reconfigurable LCOS device 11 for selectively steering individual wavelength channels common-port fibers 3 and add/drop fibers 5, and an array of movable MEMS mirrors 13 for coupling each channel into a corresponding add/drop fiber in the demultiplexing operation. In the multiplexing operation, the MEMS mirrors 13 select a desired region of the LCOS device 11, which; in turn, couples each channel to a desired common-port fiber 3. In either regime, the unique optical system ensures that, for a given available switching angle of the LCOS device, optical signals can be routed to a large number of output fibers.

Furthermore, the number of accessible fibers for a given switching angle can be increased by offsetting common-port fibers 3 and/or add/drop fibers 5 in the dispersion dimension as well as in the switching dimension. This is achievable driving the LCOS device 11 appropriately and using MEMS mirrors 13 that accurately steer optical beams in two dimensions. Additionally, this offsetting of fibers reduces coherent cross-talk in the multidirectional multiplexer as channels having a common wavelength are offset from one another on adjacent processing regions 53 of the LCOS device 11.

Another major advantage of the presently disclosed multidirectional multiplexer is its capability to handle optical channels having variable spectral spacing and width. This is achieved by varying the number of LCOS pixels allocated to each channel in the dispersion dimension. This is advantageous in optical networks implementing a dual channel plan (50 GHz or 100 GHz channel spacing), a mixed channel plan (50 GHz and 100 GHz channel spacing) or other flexible channel plans. Further, it is envisaged that additional, more flexible channel plans will be implemented in the future to manage increased bandwidth usage. The presently disclosed multidirectional multiplexer will be well placed to deal with such future flexible channel plans. Such flexible channel routing is not possible with fixed array MEMs devices of the prior art.

Finally, the embodiments described above are symmetric in operation, thereby allowing directionless operation as both a multiplexer and a demultiplexer.

Interpretation

Throughout this specification, use of the term "element" is intended to mean either a single unitary component or a collection of components that combine to perform a specific function or purpose.

Throughout this specification, use of the term "orthogonal" is used to refer to a 90° difference in orientation when expressed in a Jones vector format or in a Cartesian coordinate system. Similarly, reference to a 90° rotation is interpreted to mean a rotation into an orthogonal state.

Reference throughout this specification to the terms "optical beam" are intended to mean, and be used synonymously with the terms "optical signal" to describe the WDM signal to be monitored by the optical channel monitor. Reference is particularly made to "optical beam" as the WDM signal is often described in terms of spatial characteristics and propagation, which, for ease of understanding, is more clearly described by the term "beam" rather than "signal". However, it will be appreciated that such "optical beams" include the wavelength information and propagation characteristics indicative of a transmitted optical signal.

It will also be appreciated that the term "optical" used in this specification is not intended to restrict the notion of optical beams and beams being in the visual range of electromagnetic waves. Rather, the term "optical" is used to refer to any range of electromagnetic waves that can be controlled and manipulated in the appropriate manner by the described optical channel monitor. Such electromagnetic waves generally include, but are not limited to infrared, visual, and ultra-violet wavelengths.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the invention, various features of the invention are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. An optical signal manipulation system including:
   a plurality of input ports configured for transmitting an optical signal including a plurality of wavelength channels, said input ports being spatially separated at least in a switching dimension;
   a wavelength dispersion element for simultaneously spatially separating said wavelength channels from said optical signals in a dispersion dimension perpendicular to said switching dimension;
   an optical power element for focusing each said spatially separated wavelength channel in said dispersion dimension;
   a wavelength manipulation element for separately manipulating each of the focused spatially separated wavelength channels to selectively steer the wavelength channels in at least the switching dimension; and
   a steering element for independently selectively directing the wavelength channels in at least the switching dimension such that said wavelength channels are coupled to predetermined output ports disposed in predetermined positions spaced at least along said switching dimension;
   wherein said wavelength manipulation element steers said wavelength channels by an angle in the switching dimension, relative to their respective originating input port, that is less than or equal to the predetermined position of an intended said output port divided by the focal length of said optical power element.

2. An optical signal manipulation system according to claim 1 wherein said angle is approximately half the predetermined position of said intended output port divided by the focal length of said optical power element.

3. An optical signal manipulation system according to claim 1 wherein said output ports are also spatially separated in said dispersion dimension and wherein said wavelength manipulation element is also configured to independently selectively direct the optical signals in the dispersion dimension.

4. An optical signal manipulation system according to claim 3 wherein at least a subset of said input ports are also spatially separated in said dispersion dimension.

5. An optical signal manipulation system according to claim 1 wherein said wavelength manipulation element steers each said wavelength channel by an angle in the switching dimension, relative to a respective originating input port, that is less than an angle directed by said steering element in the switching dimension, relative to an intended output port.

6. An optical signal manipulation system according to claim 1 wherein said wavelength channels are incident onto said wavelength manipulation element at substantially parallel angles in the switching dimension.

7. An optical signal manipulation system according to claim 1 wherein the steering element includes a micro-electromechanical (MEMS) mirror array having one mirror for each said output port.

8. An optical signal manipulation system according to claim 1 wherein the wavelength manipulation element includes a liquid crystal on silicon (LCOS) device having a two-dimensional array of phase manipulation elements.

9. An optical signal manipulation system according to claim 8 wherein said LCOS device includes a plurality of processing regions each defined by a subset of the phase manipulation elements, each said processing region being configured to independently manipulate said spatially separated wavelength channels originating from a corresponding input port and wherein each said processing region includes a plurality of spatially separated channel directing regions configured to independently selectively steer the wavelength channels in the switching dimension.

10. An optical manipulation system according to claim 9 wherein said channel directing regions are reconfigurable in size to accommodate wavelength channels of different spectral width and spacing.

11. An optical manipulation system according to claim 9 wherein said channel directing regions on adjacent processing regions corresponding to a particular wavelength channel are offset from one another in the dispersion dimension.

12. An optical signal manipulation system according to claim 1 further including a Fourier transformer for converting the spatial offset of each said optical signal to a predefined angle in the switching dimension.

13. An optical signal manipulation system according to claim 12 wherein said Fourier transformer includes:
a first angled reflector surface for projecting said optical signals in a dimension perpendicular to their propagation direction;
a spherical mirror for angularly encoding said optical signals with a predefined angle based on their respective position along the switching dimension; and
a second angled reflector surface for returning said signals to their original propagation direction.

14. An optical signal manipulation system according to claim 1 including a directional signal separator for separating, in space, optical signals that propagate from said input ports to said wavelength manipulation element from optical signals that propagate from said wavelength manipulation element to said steering element.

15. An optical signal manipulation system according to claim 13 wherein said directional signal separator includes an angled mirror having an aperture extending therethrough.

16. An optical signal manipulation system according to claim 1 wherein said system is symmetric in optical path length about said wavelength manipulation element.

17. An optical signal manipulation system according to claim 1 being reversible in operation such that optical signals including one wavelength channel are input from said output ports to be coupled to predetermined input ports.

18. An optical signal manipulation system for switching wavelength channels between M common-port optical fibers and N add/drop optical fibers, the system including:
a plurality (M) of common-port optical fibers, each configured for transmitting an optical signal including a plurality of wavelength channels, said common-port optical fibers being spatially separated at least in a switching dimension;
a plurality (N) of add/drop optical fibers, each configured for receiving one or more individual wavelength channels, said add/drop optical fibers being spatially separated at least in the switching dimension;
a wavelength dispersion element for simultaneously spatially separating said wavelength channels from said optical signals in a dispersion dimension perpendicular to said switching dimension;
an optical power element for focusing each said spatially separated wavelength channel in said dispersion dimension;
a wavelength manipulation element including a two-dimensional array of independently drivable elements divided into M separate processing regions, each processing region separately manipulating each of the focused spatially separated wavelength channels of a corresponding optical signal to selectively independently steer the wavelength channels a first angle in the switching dimension relative to a respective originating common-port optical fiber to one of N steering elements; and
a plurality (N) of steering elements, each for independently selectively steering the wavelength channels at a second angle in the switching dimension relative to an associated add/drop optical fiber such that said wavelength channels are coupled to said associated add/drop optical fibers;
wherein first angle is less than said second angle.

19. An optical signal manipulation system including:
a series of optical input ports each for projecting a corresponding optical input signal, said signals including a predetermined series of wavelength channels;
a translation unit for translating the relative spatial position of the optical input port to a corresponding relative angular projection of the ports optical input signal;
an optical power element for focusing the optical energy of said optical input signals; and
an optical dispersion system for spatially dividing out wavelength channels of each optical input signal;
whereby the system produces an intermediate output of a series of spatially separated columns for each optical input signal, with each column having its wavelength dispersed along the column; and
whereby the intermediate output is projected onto a wavelength manipulation element for independently steering the wavelength channels to one of a plurality of output ports.

20. An optical signal manipulation system according to claim 1 wherein wavelength channels transmitted from different input ports and having a common wavelength are incident onto said wavelength manipulation element at positions offset from each other in said dispersion dimension.

21. An optical signal manipulation system according to claim 18 wherein said wavelength manipulation element steers said wavelength channels by an angle in the switching dimension, relative to their respective add/drop optical fiber, that is less than or equal to the predetermined position of an originating common-port optical fiber divided by the focal length of said optical power element.

* * * * *